(12) United States Patent
Uchiyama et al.

(10) Patent No.: US 8,111,459 B2
(45) Date of Patent: Feb. 7, 2012

(54) LAMINATED POLARIZING FILM, PHASE RETARDATION FILM, AND LIQUID CRYSTAL DISPLAY DEVICE

(75) Inventors: Akihiko Uchiyama, Hino (JP); Yuhei Ono, Hino (JP); Jyuho Matsuo, Hino (JP)

(73) Assignee: Teijin Limited, Osaka (JP)

( * ) Notice: Subject to any disclaimer, the term of this patent is extended or adjusted under 35 U.S.C. 154(b) by 685 days.

(21) Appl. No.: 12/281,067

(22) PCT Filed: Feb. 26, 2007

(86) PCT No.: PCT/JP2007/054116
§ 371 (c)(1),
(2), (4) Date: Aug. 28, 2008

(87) PCT Pub. No.: WO2007/100117
PCT Pub. Date: Sep. 7, 2007

(65) Prior Publication Data
US 2009/0231520 A1    Sep. 17, 2009

(30) Foreign Application Priority Data

Feb. 28, 2006   (JP) .................................. 2006-052222
Feb. 28, 2006   (JP) .................................. 2006-052223

(51) Int. Cl.
*G02B 5/30* (2006.01)
*G02F 1/1335* (2006.01)

(52) U.S. Cl. ................ 359/489.01; 359/489.02; 349/119

(58) Field of Classification Search ............. 359/487.01, 359/489.01, 489.02, 492.01; 347/119–121; 349/119–121
See application file for complete search history.

(56) References Cited

U.S. PATENT DOCUMENTS 7,223,452 B2 *   5/2007   Murakami et al. ............. 428/1.3
(Continued)

FOREIGN PATENT DOCUMENTS

JP             4-116603 A        4/1992
(Continued)

OTHER PUBLICATIONS

Saitoh, Yukito, "Optimum Film Compensation of Viewing Angle of Contrast in In-Plane-Switching-Mode Liquid Crystal Display", Jpn. J. Appl. Phys., vol. 37 (1998), pp. 4822-4828, Part 1, No. 9A, Sep. 1998.

(Continued)

*Primary Examiner* — Frank Font
(74) *Attorney, Agent, or Firm* — Sughrue Mion, PLLC

(57) ABSTRACT

A laminated polarizing film that is capable of enhancing a viewing angle of a liquid crystal display device, particularly in an IPS mode, is provided. The laminated polarizing film can be obtained by adhering a phase retardation film and a polarizing film by a roll-to-roll process. Specifically, the laminated polarizing film contains a negative substantially uniaxial optical film containing a thermoplastic polymer having a negative molecular polarizability anisotropy, a positive optical film containing a thermoplastic polymer having a positive molecular polarizability anisotropy, and a polarizing film, that are laminated at least in this order, a slow axis within a film plane of the negative substantially uniaxial optical film and a slow axis within a film plane of the positive optical film are substantially in parallel to each other, and each are substantially perpendicular to an absorption axis of the polarizing film, a positional relationship between a principal orientation direction of polymer main chains of the negative substantially uniaxial optical film and the absorption axis of the polarizing film is substantially in parallel, and a positional relationship between a principal orientation direction of polymer main chains of the positive optical film and the absorption axis of the polarizing film is substantially perpendicular.

20 Claims, 10 Drawing Sheets

U.S. PATENT DOCUMENTS

| | | | |
|---|---|---|---|
| 7,264,852 B2 * | 9/2007 | Koishi et al. | 428/1.3 |
| 7,492,516 B2 * | 2/2009 | Takahashi et al. | 359/489.01 |
| 2005/0024726 A1 * | 2/2005 | Ouderkirk et al. | 359/494 |
| 2006/0109404 A1 * | 5/2006 | Maeda | 349/119 |
| 2010/0188626 A1 * | 7/2010 | Jeon et al. | 349/119 |

FOREIGN PATENT DOCUMENTS

| | | |
|---|---|---|
| JP | 2612196 | 2/1997 |
| JP | 2809712 | 7/1998 |
| JP | 2818983 | 8/1998 |
| JP | 2994013 | 10/1999 |
| JP | 3168850 | 3/2001 |
| JP | 2001-194668 A | 7/2001 |
| JP | 2002-221622 A | 8/2002 |
| JP | 2005-173584 A | 6/2005 |
| JP | 2005-241965 A | 9/2005 |
| WO | 2006/030797 A1 | 3/2006 |

OTHER PUBLICATIONS

Chen, J., Optimum Film Compensation Modes for TN and VA LCDs, SID 98 Digest, pp. 315-318.

* cited by examiner

LAMINATED POLARIZING FILM, PHASE RETARDATION FILM, AND LIQUID CRYSTAL DISPLAY DEVICE

TECHNICAL FIELD

The present invention relates to a laminated polarizing film that contributes to improvement in viewing angle characteristics of a liquid crystal display device, a phase retardation film used in the laminated polarizing film, and a liquid crystal display device using the laminated polarizing film.

BACKGROUND ART

In recent years, owing to improvement in performance of a liquid crystal display device, particularly excellent performance of a vertically alignment mode and an in-plane switching (hereinafter referred to as IPS) mode, liquid crystal television sets using the modes are replacing conventional CRT television sets. A phase retardation film as an optical film having an optical anisotropy plays an important role for improvement of a liquid crystal display device, particularly enhancement of a viewing angle. For example, it is one of the features of a conventional IPS mode that a wide viewing angle is obtained without the use of a phase retardation film, but due to progress of techniques for enhancing a viewing angle based on optical designing techniques using a phase retardation film in recent years, it is becoming difficult to distinguish the IPS mode from the other modes without the use of a phase retardation film.

It has been known that a polarizing film containing a dichroic dye, such as iodine and the like, has a problem in viewing angle by itself. Specifically, in the case where two polarizing films are disposed with absorption axes thereof being perpendicular to each other, the films substantially do not transmit light incident perpendicularly from the front, but cannot completely block light incident at an azimuthal angle other than the absorption axes due to a geometric apparent deviation in absorption axes. The viewing angle in the IPS mode cannot be further enhanced unless the problem in viewing angle of a polarizing film is resolved.

Under the circumstances, there is an increasing need of development of optical designing techniques using a phase retardation film for attaining further enhancement of a viewing angle in the IPS mode.

In view of the need, for example, Non-patent Document 1 discloses a system of optical compensation using a biaxial phase retardation film. Non-patent Document 2 discloses a viewing angle enhancing technique with a polarizing film having a combination of a positive uniaxial A-plate and a positive uniaxial C-plate, applied to enhancement of the viewing angle of the IPS mode.

In the viewing angle enhancing techniques, it is important to control a refractive index anisotropy of a phase retardation film, and for example, Patent Documents 1 to 4 disclose such a technique that the principal refractive indices in the three directions that are perpendicular to each other and in parallel or perpendicular to the plane of the phase retardation film are controlled in such a manner that, specifically, the principal refractive index in the thickness direction is larger than one of the two principal refractive indices within the plane and is smaller than the other of them, whereby the viewing angle dependency of the phase retardation of the phase retardation film is reduced.

Patent Document 5 proposes a technique of improving the viewing angle dependency of the phase retardation film by laminating a positive uniaxial optical film having an optical axis within the plane thereof and a negative uniaxial optical film having an optical axis within the plane thereof.

Non-patent Document 1
   Yukita Saitoh, Shinichi Kimura, Kaoru Kusafuka and Hidehisa Shimizu, Japanese Journal of Applied Physics, vol. 37, pp. 4822-4828 (1998)
Non-patent Document 2
   J. Chen, K.-H. Kim, J.-J. Jyu, J. H. Souk, J. R. Kelly and P. J. Bos, Society for Information Display '98 Digest, p. 315 (1998)
Patent Document 1
   Japanese Patent 2,612,196
Patent Document 2
   Japanese Patent 2,994,013
Patent Document 3
   Japanese Patent 2,818,983
Patent Document 4
   Japanese Patent 3,168,850
Patent Document 5
   Japanese Patent 2,809,712

DISCLOSURE OF THE INVENTION

Problems to be Solved by the Invention

However, there are unlimited demands for enhancing a viewing angle of a liquid crystal display device, and it is demanded to be further enhanced.

In conventional techniques, furthermore, a phase retardation film and a polarizing film are produced in separate processes into separate rolls, and upon producing a laminated body thereof, it is necessary to adhere them in a certain measure through a tackiness agent or the like. A roll of a laminated polarizing film having a phase retardation film and a polarizing film adhered to each other has not yet been realized.

This is because a roll of a laminated polarizing film having a phase retardation film and a polarizing film adhered to each other is produced necessarily by roll-to-roll lamination using a roll of a phase retardation film and a roll of a polarizing film. Specifically, a laminated polarizing film exhibiting stable performance cannot be obtained since upon conducting roll-to-roll lamination, the controlling range of the phase retardation and the controlling direction of the optical axis vary depending on the materials, the production process and the like of the phase retardation film used.

However, production of a laminated polarizing film by a roll-to-roll process not only improves the productivity of the laminated polarizing film, but also expects, for example, improvement in polarizing capability by improving accuracy in adhesion angle and the like. Accordingly, novel optical design and novel material design capable of attaining roll-to-roll lamination are demanded.

An object of the invention is to provide a laminated polarizing film that is capable of enhancing a viewing angle of a liquid crystal display device, particularly in an IPS mode.

Another object of the invention is to provide a laminated polarizing film having a phase retardation film and a polarizing film having been adhered by a roll-to-roll process.

Means for Solving the Problems

The inventors have made earnest investigations for attaining the objects. As a result, it has been successfully found a compensation constitution and a material constitution that are capable of enhancing a viewing angle of a liquid crystal display device, particularly in an IPS mode, and capable of adhering a phase retardation film and a polarizing film by a roll-to-roll process.

The objects of the invention is attained by, as a first aspect:

a laminated polarizing film containing a negative substantially uniaxial optical film containing a thermoplastic polymer having a negative molecular polarizability anisotropy, a positive optical film containing a thermoplastic polymer having a positive molecular polarizability anisotropy, and a polarizing film, that are laminated at least in this order, a slow axis within a film plane of the negative substantially uniaxial optical film and a slow axis within a film plane of the positive optical film being substantially in parallel to each other, and each being substantially perpendicular to an absorption axis of the polarizing film, a positional relationship between a principal orientation direction of polymer main chains of the negative substantially uniaxial optical film and the absorption axis of the polarizing film being substantially in parallel, and a positional relationship between a principal orientation direction of polymer main chains of the positive optical film and the absorption axis of the polarizing film being substantially perpendicular.

The objects of the invention is attained by, as a second aspect:

a laminated polarizing film containing a positive substantially uniaxial optical film containing a thermoplastic polymer having a positive molecular polarizability anisotropy, a negative optical film containing a thermoplastic polymer having a negative molecular polarizability anisotropy, and a polarizing film, that are laminated at least in this order, a slow axis within a film plane of the positive substantially uniaxial optical film and a slow axis within a film plane of the negative optical film each being substantially in parallel to an absorption axis of the polarizing film, a positional relationship between a principal orientation direction of polymer main chains of the positive substantially uniaxial optical film and the absorption axis of the polarizing film being substantially in parallel, and a positional relationship between a principal orientation direction of polymer main chains of the negative optical film and the absorption axis of the polarizing film being substantially perpendicular.

Advantages of the Invention

The laminated polarizing film of the invention attains enhancement of a viewing angle of a polarizing film and attains high performance of a laminated polarizing film. Application of the laminated polarizing film to a liquid crystal display device, particularly in an IPS mode, enhances a viewing angle of the liquid crystal display device.

In the laminated polarizing film of the invention, a phase retardation film and a polarizing film can be adhered continuously by a roll-to-roll process, whereby for example, the polarizing capability can be improved by improving accuracy in adhesion angle and the like, and the productivity can be improved.

BEST MODE FOR CARRYING OUT THE INVENTION

Figure 1:
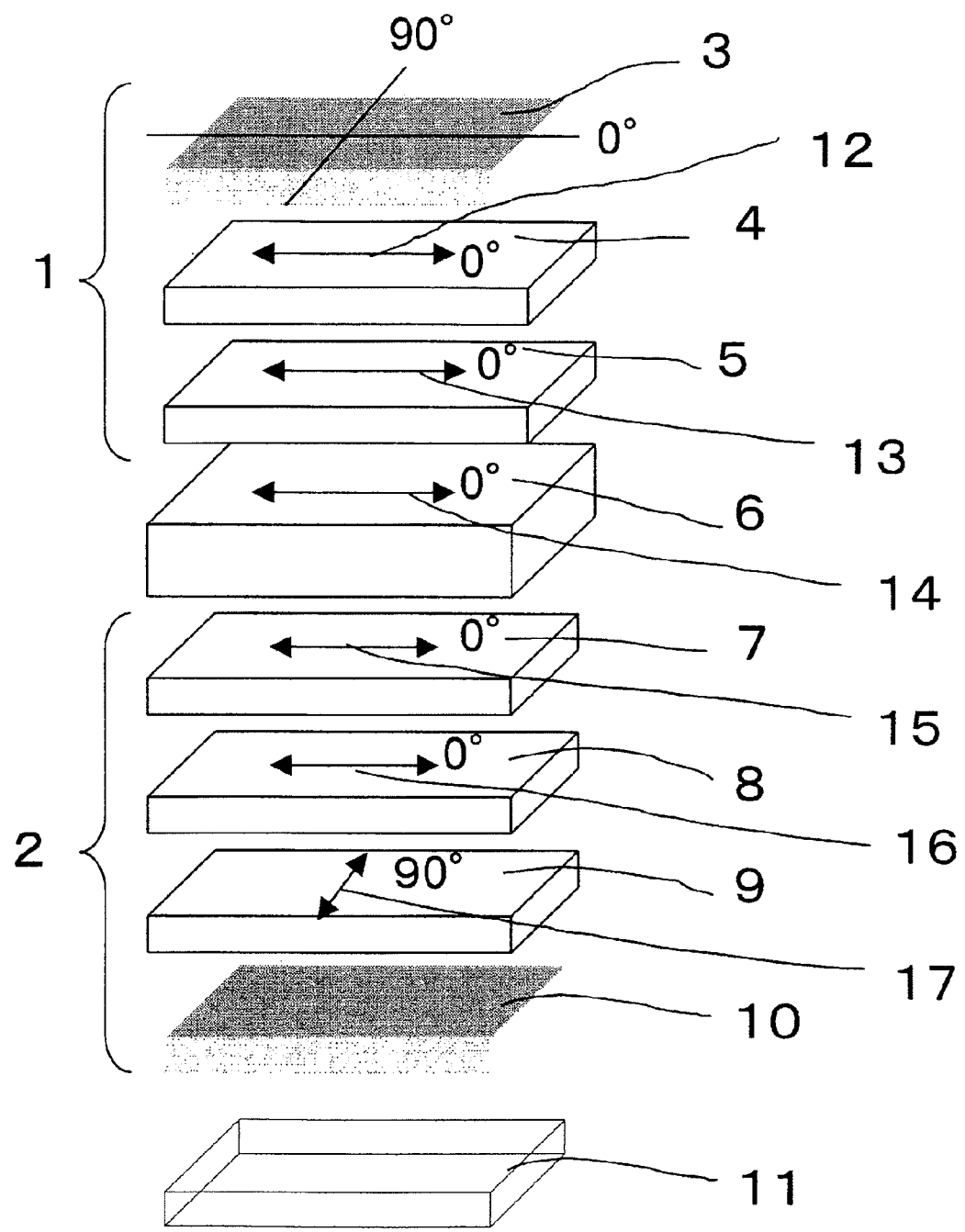
FIG. 1 is an arrangement view of optical elements in Examples 1 and 3 to 5. The angles in the figure show azimuthal angles. Adhesion layers and tackiness agent layers between the optical elements are omitted.

In the invention, the "phase retardation film" means one type of a polarization scrambler that applies a phase retardation to polarized light to produce another polarization state, and the negative substantially uniaxial optical film and the positive optical film used in the first laminated polarizing film of the invention, and the positive substantially uniaxial optical film and the negative optical film used in the second laminated polarizing film of the invention are defined as one type of a phase retardation film.

Accordingly, the negative substantially uniaxial optical film and the positive optical film, and the positive substantially uniaxial optical film and the negative optical film may be hereinafter referred to as an optical film or a phase retardation film in some cases.

In the invention, the "thermoplastic polymer having a positive molecular polarizability anisotropy" is defined as such a material that upon uniaxially stretching in machine direction with freedom in transversal direction, the stretching direction agrees with the direction where the refractive index is maximized within the film plane. The "thermoplastic polymer having a negative molecular polarizability anisotropy" is defined as such a material that upon uniaxially stretching in machine direction with freedom in transversal direction, the direction perpendicular to the stretching direction agrees with the direction where the refractive index is maximized within the film plane.

In general, the in-plane phase retardation value (R value), the orientation index in the thickness direction Nz, and the three-dimensional refractive indices $n_x$, $n_y$ and $n_z$ depend on the wavelength, and in the invention, they are values measured at a measurement wavelength of 550 nm unless otherwise indicated. In the invention, the three-dimensional refractive indices $n_x$, $n_y$ and $n_z$ are defined as follows:

$n_x$: refractive index in the direction within the film plane where the refractive index is maximized $n_y$: refractive index in the direction within the film plane perpendicular to the direction where the refractive index is maximized $n_z$: refractive index in the normal direction with respect to the film plane The in-plane phase retardation value (R value) (nm) is defined by using the three-dimensional refractive indices as follows:

$$R=(n_x-n_y) \times d \quad (4)$$

wherein d represents the thickness (nm).

The orientation index in the thickness direction Nz is defined by using the three-dimensional refractive indices as follows:

$$Nz=(n_x-n_z)/(n_x-n_y) \quad (5)$$

The invention will be described in detail below.

The first laminated polarizing film of the invention will be described.

In the first laminated polarizing film, the "negative uniaxiality" means that the orientation index in the thickness direction Nz defined by the expression (5) is Nz=0, and the "negative substantially uniaxial optical film" is defined as the expression (6):

$$-0.2<Nz<0.2 \quad (6)$$

The orientation index in the thickness direction Nz of the negative substantially uniaxial optical film is preferably $-0.1<Nz<0.1$, and more preferably $-0.05<Nz<0.05$.

The "positive optical film" in the first laminated polarizing film is defined by the orientation index in the thickness direction Nz as the expression (7):

$$Nz \geq 1 \quad (7)$$

In the first laminated polarizing film, the state where the slow axes within the film plane of the negative substantially uniaxial optical film and the positive optical film are "substantially in parallel" to each other means that the angle between the axes is in a range of $\pm 2°$, preferably in a range of $\pm 1°$, and more preferably in a range of $\pm 0.5°$.

The state where the slow axes within the film plane of the negative substantially uniaxial optical film and the positive optical film are "substantially perpendicular" to the absorption axis of the polarizing film means that the angle between the axes is in a range of $90\pm 2°$, preferably in a range of $90\pm 1°$, and more preferably in a range of $90\pm 0.5°$.

For enabling formation of the first laminated polarizing film of the invention capable of improving a viewing angle of a polarizing film by a roll-to-roll process, it is necessary that the principal orientation direction of polymer main chains of the negative substantially uniaxial optical film and the absorption axis of the polarizing film are substantially in parallel to each other, and the principal orientation direction of polymer main chains of the positive optical film and the absorption axis of the polarizing film are substantially perpendicular to each other.

In the invention, the "principal orientation direction of polymer main chains" is the principal orientation direction within the film plane where the polymer main chains are oriented statistically most frequently, and in general, can be identified by a combination of an optical measuring method, such as measurement of a refractive index, birefringence index or the like, and a method of analyzing the molecular vibration direction by a dichroic infrared spectroscopy, and the like. In uniaxial stretching, the stretching direction is generally the "principal orientation direction of polymer main chain".

One preferred embodiment of the first laminated polarizing film of the invention is, from the standpoint of improvement in performance, the laminated polarizing film in a roll form, in which the slow axes within the film plane of the negative substantially uniaxial optical film and the positive optical film are substantially perpendicular to the longitudinal direction, and the absorption axis of the polarizing film is substantially in parallel to the longitudinal direction.

The state where the slow axes within the film plane of the negative substantially uniaxial optical film and the positive optical film are "substantially perpendicular" to the longitudinal direction means that the in-plane slow axes are in a range of $90\pm 2°$, preferably in a range of $90\pm 1°$, and more preferably in a range of $90\pm 0.5°$, with respect to the longitudinal direction being 0°.

Similarly, the state where the in-plane absorption axis of the polarizing film is "substantially in parallel" to the longitudinal direction means that the absorption axis is in a range of $\pm 2°$, preferably in a range of $\pm 1°$, and more preferably in a range of $\pm 0.5°$, with respect to the longitudinal direction being 0°.

A polarizing film exhibiting performance with molecular orientation of an absorptive dichroic substance, such as iodine and the like, having been widely used is generally produced by continuous longitudinal uniaxial stretching for obtaining a high polarization degree, and therefore, the absorption axis thereof is in the longitudinal direction. Accordingly, for obtaining the first laminated polarizing film of the invention by a roll-to-roll process, it is preferred that the slow axes in the film plane of the negative substantially uniaxial optical film and the positive optical film are substantially perpendicular to the longitudinal direction, and the absorption axis of the polarizing film is substantially in the longitudinal direction. As a method for obtaining the state of the directions of the axes, it is preferred that the negative substantially uniaxial optical film is produced by longitudinal uniaxial stretching, and the positive optical film is produced by transversal uniaxial stretching.

For obtaining the first laminated polarizing film of the invention that is excellent in performance, the in-plane phase retardation value $R_{NEA}(\lambda)$ of the negative substantially uniaxial optical film is preferably in a range of:

$$50 \leq R_{NEA}(\lambda) \leq 170 \quad (1)$$

more preferably in a range of:

$$60 \leq R_{NEA}(\lambda) \leq 160 \quad (8)$$

further preferably in a range of:

$$70 \leq R_{NEA}(\lambda) \leq 150 \quad (9)$$

and particularly preferably in a range of:

$$80 \leq R_{NEA}(\lambda) \leq 140 \quad (10)$$

The in-plane phase retardation value $R_{PNZ}$ and the orientation index in the thickness direction Nz defined by the expression (5) of the positive optical film are preferably:

$$10 \leq R_{PNZ}(\lambda) \leq 100 \quad (2)$$

and $$1 \leq Nz(\lambda) \leq 2 \quad (3)$$

more preferably:

$$15 \leq R_{PNZ}(\lambda) \leq 90 \quad (11)$$

and $$1.05 \leq Nz(\lambda) \leq 1.7 \quad (12)$$

further preferably:

$$20 \leq R_{PNZ}(\lambda) \leq 80 \quad (13)$$

and $$1.1 \leq Nz(\lambda) \leq 1.5 \quad (14)$$

and particularly preferably:

$$25 \leq R_{PNZ}(\lambda) \leq 70 \quad (15)$$

and $$1.15 \leq Nz(\lambda) \leq 1.4 \quad (16)$$

The ranges are determined from the standpoint of the polarization performance, the adequateness to a roll-to-roll process, and the like.

In the first laminated polarizing film of the invention, at least one of the negative substantially uniaxial optical film and the positive optical film preferably has reverse wavelength dispersion characteristics of the phase retardation. The reverse wavelength dispersion characteristics of the phase retardation satisfies the expression (17):

$$R(\lambda 1) < R(\lambda 2) \quad (17)$$

In the expression (17), R represents the absolute value of the phase retardation, and $\lambda$ represents the measurement wavelength (nm) and satisfies 400 nm<$\lambda 1$<$\lambda 2$<700 nm.

In the first laminated polarizing film of the invention, in the case where at least one of the negative substantially uniaxial optical film and the positive optical film has reverse wavelength dispersion characteristics of the phase retardation, a wide bandwidth property can be imparted to the polarizing capability of the laminated polarizing film, and as a specific effect on applying to a liquid crystal display device, the transmittance dispersion can have a wide bandwidth to suppress color shift due to change in viewing angle. While the effect can be obtained when at least one of the optical films has the reverse wavelength dispersion characteristics, it is preferred that both of them have the reverse wavelength dispersion characteristics.

As more preferred reverse wavelength dispersion characteristics, the following expressions (18) and (19) are simultaneously satisfied:

$$0.50 < R(450)/R(550) < 0.99 \quad (18)$$

$$1.01 < R(650)/R(550) < 1.50 \quad (19)$$

(wherein R(450), R(550) and R(650) are in-plane phase retardation values of the phase retardation film measured at measurement wavelengths of 450, 550 and 650 nm, respectively).

A material for the phase retardation film used in the first laminated polarizing film of the invention is necessarily a thermoplastic polymer, and is preferably non-crystalline at a molding temperature of the film, from the standpoint of moldability and the like.

The thermoplastic polymer having a negative molecular polarizability anisotropy forming the negative substantially uniaxial optical film used in the first laminated polarizing film is preferably an amorphous polymer from the standpoint of moldability, controllability in phase retardation, and the like. Examples thereof include polycarbonate, polystyrene, syndiotactic polystyrene, amorphous polyolefin, a polymer having a norbornene skeleton, an organic acid-substituted cellulose polymer, polyether sulfone, polyarylate, polyester, polyamide, polyimide, olefin maleimide, copolymer olefin maleimide having a phenyl group, a blend of polystyrene and polyphenylene oxide, and the like.

The thermoplastic polymer having a negative molecular polarizability anisotropy forming the negative substantially uniaxial optical film used in the first laminated polarizing film is particularly preferably one containing polycarbonate having a fluorene skeleton. For imparting a negative molecular polarizability to a polymer, in general, it is necessary to provide a bulky molecular group in the side chain direction, and this makes the polymer brittle. Polycarbonate has a flexible structure owing to a high rotation freedom of the carbonate bond, which brings about an excellent mechanical strength even when a bulky molecular group is present on the side chain, and therefore it can be a film that is optimum as an optical film for a display device.

A fluorene skeleton is oriented perpendicularly to the polymer main chain, and thus a large negative molecular polarizability anisotropy can be obtained.

A preferred chemical structure of the polycarbonate having a fluorene skeleton capable of forming the negative substantially uniaxial optical film used in the first laminated polarizing film is a polymer or a polymer blend containing a repeating unit represented by the following formula (I):

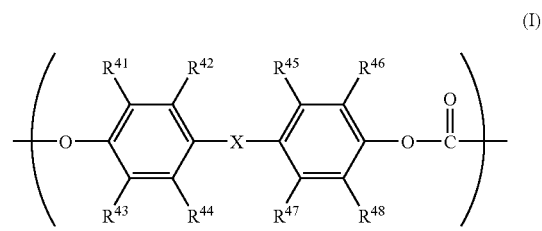

wherein $R^{41}$ to $R^{48}$ each independently represent a group selected from the group consisting of a hydrogen atom, a halogen atom, a hydrocarbon group having from 1 to 6 carbon atoms and a hydrocarbon-O— group having from 1 to 6 carbon atoms; X represents a group represented by the following formula (1)-1:

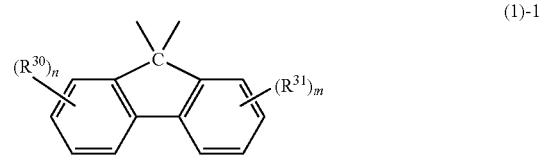

$R^{30}$ and $R^{31}$ each independently represent a group selected from the group consisting of a halogen atom and an alkyl group having from 1 to 3 carbon atoms; and n and m each independently represent an integer of from 0 to 4.

The content of the repeating unit represented by the formula (I) in the polymer or the polymer blend is preferably from 50 to 99% by mol, more preferably from 60 to 95% by mol, and further preferably from 70 to 90% by mol, based on the total repeating units of the polymer or the polymer blend.

The polycarbonate material having a fluorene skeleton can be preferably used as the phase retardation film in the first laminated polarizing film of the invention since it has a high glass transition temperature and is excellent in handleability, stretching and molding property, and the like.

A more preferred polycarbonate material capable of forming the negative substantially uniaxial optical film used in the first laminated polarizing film contains the repeating unit represented by the formula (I) and a repeating unit represented by the following formula (II):

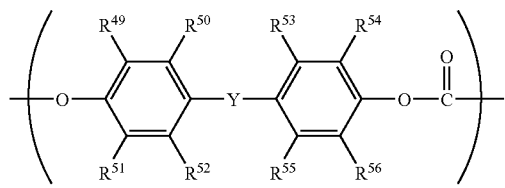

in which the content of the repeating unit represented by the formula (I) is from 50 to 99% by mol, more preferably from 60 to 95% by mol, and further preferably from 70 to 90% by mol, based on the total of the repeating units represented by the formulae (I) and (II).

In the formula (II), $R^{49}$ to $R^{56}$ each independently represent a group selected from the group consisting of a hydrogen atom, a halogen atom and a hydrocarbon group having from 1 to 22 carbon atoms; and Y represents a group selected from the group consisting of groups represented by the following formulae:

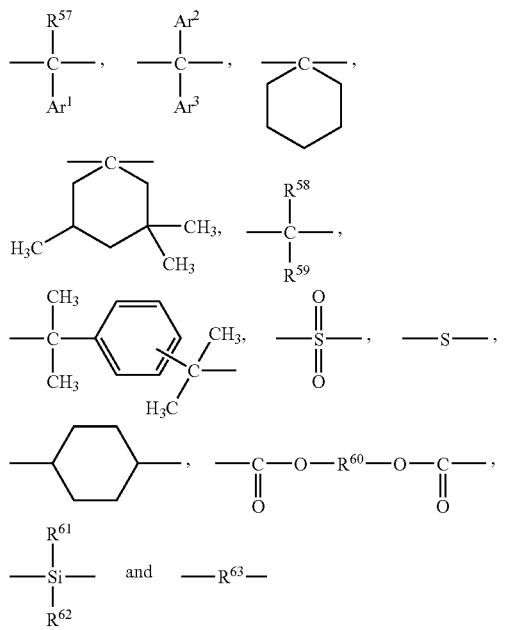

In Y, $R^{57}$ to $R^{59}$, $R^{61}$ and $R^{62}$ each independently represent a group selected from the group consisting of a hydrogen atom, a halogen atom and a hydrocarbon group having from 1 to 22 carbon atoms, such as an alkyl group and an aryl group; $R^{60}$ and $R^{63}$ each independently represent a group selected from the group consisting of a hydrocarbon group having from 1 to 20 carbon atoms, such as an alkyl group and an aryl group; and $Ar^1$ to $Ar^3$ each independently represent a group selected from the group consisting of an aryl group having from 6 to 10 carbon atoms, such as a phenyl group.

The polycarbonate copolymer having a fluorene skeleton and/or the polymer blend can be produced by a known method. For example, it can be preferably produced by a method of polycondensation of a dihydroxy compound and phosgene, a melt-polycondensation method, a solid-state polymerization method or the like. In the case of the blend, a compatible blend is preferred, but even when the components are not completely compatible, the combination of the refractive indices of the components can suppress light scattering among the components to improve the transparency.

The thermoplastic polymer having a positive molecular polarizability anisotropy forming the positive optical film used in the first laminated polarizing film is preferably an amorphous polymer from the standpoint of moldability, controllability in phase retardation, and the like. Examples the thermoplastic polymer include polycarbonate, an organic acid-substituted cellulose polymer, polyimide, polyamide, polyester, polyether ketone, polyarylate, polyaryl ether ketone, polyamideimide, polyesterimide and polyolefin. The thermoplastic polymer may be used solely or as a blend of two or more kinds thereof. Among these, one containing amorphous polyolefin is further preferred from the standpoint of the wavelength dispersion characteristics of the phase retardation.

The thermoplastic polymer having a positive molecular polarizability anisotropy forming the positive optical film used in the first laminated polarizing film is particularly preferably amorphous polyolefin having a norbornene skeleton, and most preferably a thermoplastic polymer that (i) is a copolymer containing ethylene and norbornene, and (ii) has a ratio of the meso configuration and the rasemo configuration of meso/rasemo>4 in the steric configuration of the dyad of the norbornene unit.

A preferred structure and the like of the amorphous polyolefin will be described below. The amorphous polyolefin capable of forming the positive optical film used in the first laminated polarizing film is preferably a copolymer of ethylene and norbornene formed through vinyl polymerization, and contains the following repeating units (A) and (B):

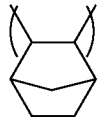

The glass transition temperature (Tg) of the copolymer is preferably in a range of from 100 to 180° C. In the copolymer, the composition of the repeating units (A) and (B) substantially correlates to the glass transition temperature, and the molar ratio of the repeating units is preferably in a range of (A)/(B)=61/39 to 40/60. The glass transition temperature is more preferably in a range of from 120 to 160° C., and the molar ratio of the repeating units is more preferably in a range of (A)/(B)=57/43 to 46/54. The composition can be determined by $^{13}$C-NMR measurement.

The copolymer may further contain, in addition to the repeating units (A) and (B), a repeating unit derived from other polymerizable vinyl monomers in such an amount that does not impair the advantages of the invention. Examples of the other vinyl monomers include a cyclic olefin represented by the following formula (C):

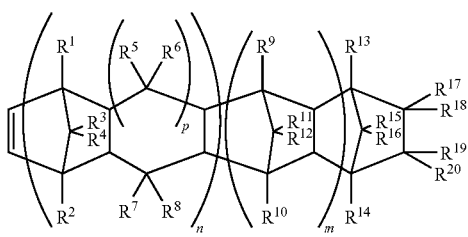

(In formula (C), n represents 0 or 1; m represents 0 or a positive integer; p represents 0 or 1; and $R^1$ to $R^{20}$ each independently represent a group selected from the group consisting of a hydrogen atom, a halogen atom and a saturated or unsaturated aliphatic hydrocarbon group having from 1 to 12 carbon atoms, in which $R^{17}$ and $R^{18}$ or $R^{19}$ and $R^{20}$ may form an alkylidene group, $R^{17}$ and $R^{18}$ or $R^{19}$ and $R^{20}$ may form a ring, and the ring may have a double bond), an α-olefin having from 3 to 18 carbon atoms, such as propylene, 1-butene, 1-hexene, 4-methyl-1-pentene, 1-octene, 1-decene, 1-dodecene, 1-tetradecene, 1-hexadecene, 1-octadecene and the like, a cycloolefin, such as cyclobutene, cyclopentene, cyclohexene, 3-methylcyclohexene, cyclooctene and the like, and the like.

Among these, an α-olefin having from 3 to 18 carbon atoms is preferably used since it can be used as a molecular weight controlling agent upon polymerization, and in particular, 1-hexene is preferably used. The other vinyl monomers may be used solely or in combination of two or more kinds thereof. The content of the repeating unit derived from the other vinyl monomers is preferably 10% by mol or less, and more preferably 5% by mol or less, based on the total repeating units.

The molecular weight of the copolymer of ethylene and norbornene that is preferably used as the thermoplastic polymer having a positive molecular polarizability anisotropy forming the positive optical film is preferably in a range of from 0.1 to 10 dL/g, and more preferably from 0.3 to 3 dL/g, in terms of the reduced viscosity ηsp/c measured as a cyclohexane solution having a concentration of 0.5 g/L at 30° C. In the case where the educed viscosity ηsp/c is less than 0.1, it is not preferred since the film becomes brittle, and in the case where it exceeds 10, the melt molding of the film is difficult to be carried out due to a too high viscosity.

As the copolymer that is preferably used as the thermoplastic polymer having a positive molecular polarizability anisotropy forming the positive optical film, one kind of the copolymer may be used as it is, two or more kinds of the copolymers that are different in composition and molecular weight may be blended. In the case of the blend, the aforementioned preferred composition and molecular weight are those totally for the blend. In the case where the blend is used, copolymers having copolymerization compositions close to each other are preferably used from the standpoint of compatibility. In the case where the compositions are too remote from each other, there is a possibility of phase separation occurring upon blending, and there is also a possibility of whitening of the film upon forming or stretching the film.

In an ethylene-norbornene copolymer, generally, a norbornene chain is present in a certain amount in any case while depending on the polymerization method, the catalyst used, the composition and the like. It has been known that a steric configuration of a dyad of a vinyl polymerization type norbornene component (hereinafter referred to as an NN dyad) has two stereoisomers, i.e., a repeating unit represented by the following formula (D) (meso configuration) and a repeating unit represented by the following formula (E) (rasemo configuration):

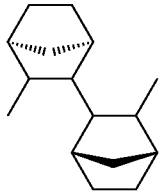

(meso configuration)

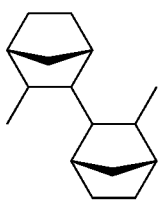

(rasemo configuration)

The copolymer that is preferably used as the thermoplastic polymer having a positive molecular polarizability anisotropy forming the positive optical film preferably has a ratio of the meso configuration and the rasemo configuration of meso/rasemo>4 (molar ratio), and more preferably meso/rasemo>6. The upper limit of the ratio is not particularly limited, and a ratio as high as possible is preferred since it is preferred for exhibiting birefringence.

The ratio of the steric isomers of the NN dyad can be obtained by $^{13}$C-NMR according to a reference literature where the stereoregularity of an ethylene-norbornene copolymer is analyzed (Macromol. Rapid Commmun., vol. 20, p. 279 (1999)), and in the first laminated polarizing film of the invention, it designates a value calculated in a $^{13}$C-NMR spectrum measured with deuterated o-dichlorobenzene as a solvent as meso/rasemo=(peak area at 28.3 ppm in $^{13}$C-NMR spectrum)/(peak area at 29.7 ppm in $^{13}$C-NMR spectrum). In the case where the ratio becomes smaller as less than 4, i.e., the proportion of the rasemo type is increased, the exhibition of birefringence is lowered. As a countermeasure thereto, there are some cases where an intended phase retardation can be obtained by such a measure as increasing the film thickness, increasing the stretching ratio, stretching at a lower temperature, and the like, but the measure is not preferred from the standpoint of low thickness, productivity and the like.

In the analysis of $^{13}$C-NMR, the ratio (molar fraction) of the NN dyad with respect to the total amount of the norbornene component, i.e., the ratio of the norbornene component that forms the dyad structure, can be obtained, which is preferably in a range of about from 0.1 to 0.6 in the first laminated polarizing film of the invention. The molar fraction referred herein is calculated as (peak area at 28.3 ppm in $^{13}$C-NMR spectrum +peak area at 29.7 ppm in $^{13}$C-NMR spectrum)/(peak area of one carbon atom of total norbornene component).

Preferred examples of a production method of the ethylene-norbornene copolymer that is preferably used as the thermoplastic polymer having a positive molecular polarizability anisotropy forming the positive optical film include a method of copolymerizing ethylene and norbornene by using a metallocene catalyst. The metallocene catalyst used for copolymerization is represented by the following formula (F):

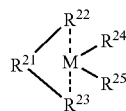

In the formula (F), M represents a metal selected from the group consisting of titanium, zirconium and hafnium; $R^{24}$ and $R^{25}$, which may be the same as or different from each other, each represent a group selected from the group consisting of a hydrogen atom, a halogen atom, a saturated or unsaturated hydrocarbon group having from 1 to 12 carbon atoms, an alkoxy group having from 1 to 12 carbon atoms and an aryloxy group having from 6 to 12 carbon atoms; $R^{22}$ and $R^{23}$, which may be the same as or different from each other, each represent a monocyclic or polycyclic hydrocarbon group capable of forming a sandwich structure with the center metal M; and $R^{21}$ is a bridge connecting the group $R^{22}$ and the group $R^{23}$ and represents a linking group selected from the following formulae:

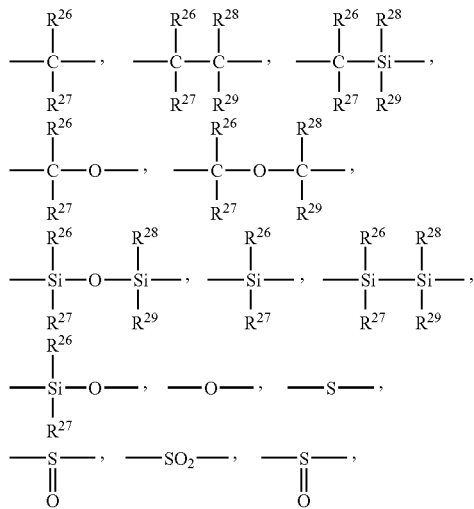

wherein $R^{26}$ to $R^{29}$, which may be the same as or different from each other, each represent a group selected from the group consisting of a hydrogen atom, a halogen atom, a saturated or unsaturated hydrocarbon group having from 1 to 12 carbon atoms, an alkoxy group having from 1 to 12 carbon atoms and an aryloxy group having from 6 to 12 carbon atoms, or $R^{26}$ and $R^{27}$ or $R^{28}$ and $R^{29}$ may form a ring.

In the case where $R^{22}$ and $R^{23}$ as ligands are the same as each other, it preferably has C2 symmetry, and in the case where they are different from each other, it preferably has C1 symmetry, with respect to the center metal M. In view of the catalyst activity, $R^{22}$ and $R^{23}$ each preferably represent a group selected from the group consisting of a pentadienyl group, an indenyl group and an alkyl- or aryl-substituted group thereof, and the center metal M is most preferably zirconium. $R^{24}$ and $R^{25}$ may be the same as or different from each other and each preferably represent an alkyl group having from 1 to 6 carbon atoms or a halogen atom, particularly a chlorine atom. $R^{26}$ to $R^{29}$ each preferably represents a group selected from the group consisting of a hydrogen atom, an alkyl group having from 1 to 6 carbon atoms and a phenyl group, and preferred examples of $R^{21}$ include a lower alkylene group, such as a methylene group, an ethylene group, a propylene group and the like, an alkylidene group, such as isopropylidene and the like, a substituted alkylene group, such as diphenylmethylene and the like, and a substituted slylene group, such as dimethylsylilene, diphenylsilylene and the like.

Specific examples of preferred metallocene include isopropylidene-(cyclopentadienyl) (1-indenyl) zirconium dichloride, isopropylidene-[(3-methyl)cyclopentadienyl] (1-indenyl) zirconium dichloride, dimethylsilylene-(cyclopentadienyl) (1-indenyl) zirconium dichloride, dimethylsilylene-bis(1-indenyl) zirconium dichloride, diphenylsilylene-bis(1-indenyl) zirconium dichloride, ethylene-bis(1-indenyl)zirconium dichloride, isopropylidene-bis (1-indenyl) zirconium dichloride and the like.

These may be used solely or in combination of two or more kinds thereof. As an auxiliary catalyst for metallocene, a known material may be used, such as methylaluminoxane as an organoaluminoxy compound, a combination of an ionic boron compound and an alkylaluminum compound, and the like.

The ethylene-norbornene copolymer that is preferably used as the thermoplastic polymer having a positive molecular polarizability anisotropy forming the positive optical film can be polymerized by a known polymerization method using the metallocene catalyst with a hydrocarbon solvent, such as toluene, xylene, cyclohexane and the like, and the resulting copolymer can be isolated by filtering from the solution obtained after the polymerization by a method, such as reprecipitating in a poor solvent, such as an alcohol and the like, followed by rinsing, adsorbing the catalyst to an adsorbent, aggregating and depositing by adding a certain additive, and the like method, and then distilling off the solvent.

Upon production (polymerization) of the copolymer, a known additive may be added depending on necessity, such as an antioxidant, e.g., Irganox (a trade name) 1010 and 1076 (produced by Ciba-Geigy) and the like, a lubricant, a plasticizer, a surfactant, an ultraviolet ray absorbent, an antistatic agent and the like.

The negative substantially uniaxial optical film and the positive optical film used in the first laminated polarizing film of the invention can be produced by forming the thermoplastic polymer into a film, which is then stretched.

As a specific film forming method, for example, an unstretched film of the thermoplastic polymer is produced by a known method, such as a solution cast method, a melt extrusion method, a heat-press method, a calendering method and the like, and then uniaxially or biaxially stretched to provide a film. Among these, a melt extrusion method is preferred from the standpoint of productivity, economy and environmental conditions including solvent-free production.

In the melt extrusion method, such a method is preferably employed that a resin is extruded with a T-die and fed to a cooling roll. The resin temperature upon extrusion is determined in consideration of the flowability, the thermal stability and the like of the resin. For example, in the case where the ethylene-norbornene copolymer is used as the thermoplastic resin, it is preferably carried out at a temperature in a range of from 220 to 300° C. In the case where the temperature is less than 220° C., the melt viscosity of the resin becomes too high, and in the case where it exceeds 300° C., there is a possibility that the transparency and homogeneity of the film are lost due to decomposition and deterioration or gelation of the resin. The temperature is more preferably in a range of from 220 to 280° C. An antioxidant is preferably added for suppressing oxidation deterioration of the resin from occurring upon melt extrusion.

In the case where the film is formed by a solution cast method, a hydrocarbon solvent, such as toluene, xylene, cyclohexane, decalin and the like, is preferably used.

Upon forming the unstretched film, fluctuation in thickness is preferably as small as possible.

The thickness in the state of the unstretched film is determined in consideration of an intended phase retardation value and thickness of a phase retardation film after stretching, and is preferably in a range of from 10 to 400 µm, more preferably in a range of from 30 to 300 µm, and further preferably in a range of from 40 to 150 µm.

The unstretched film thus obtained is uniaxially or biaxially stretched to provide the negative substantially uniaxial optical film and the positive optical film used in the first laminated polarizing film of the invention. Examples of the stretching method used include known methods, such as longitudinal uniaxial stretching between rolls, transversal uniaxial stretching using a tenter, and simultaneous biaxial stretching and sequential biaxial stretching using the combination of them. The stretching temperature is preferably around the glass transition point of the thermoplastic polymer used, and for example, is preferably in a range of from (Tg−20° C.) to (Tg+30° C.), and more preferably from (Tg−10° C.) to (Tg+20° C.), with respect to the glass transition point (Tg) of the thermoplastic polymer.

In the first laminated polarizing film of the invention, the negative substantially uniaxial optical film is preferably produced as a longitudinally uniaxially stretched film. According to the constitution, a negative substantially uniaxial optical film in a roll form having a slow axis in a direction substantially perpendicular to the longitudinal direction within the film plane can be produced. The positive optical film is preferably produced as a transversally uniaxially stretched film. According to the constitution, a positive optical film in a roll form having a slow axis in a direction substantially perpendicular to the longitudinal direction within the film plane can be produced. By using them and a polarizing film having an absorption axis in the longitudinal direction, the first laminated polarizing film of the invention can be produced by a roll-to-roll process.

The negative substantially uniaxial optical film and the positive optical film used in the first laminated polarizing film of the invention may further contain a low molecular weight additive, such as an ultraviolet ray absorbent, e.g., phenylsalicylic acid, 2-hydroxybenzophenone, triphenyl phosphate and the like, a bluing agent for changing color tone, an antioxidant and the like.

The polarizing film constituting the first and second laminated polarizing films of the invention is not particularly limited, and an appropriate one capable of providing light in a prescribed polarized state may be used. In the invention, one capable of providing transmitted light in a linearly polarized state is preferably used. Examples of the polarizing film include a polarizing film obtained by adsorbing iodine and/or a dichroic dye to a hydrophilic polymer film, such as a polyvinyl alcohol film, a partially formalated polyvinyl alcohol film and a partially saponified ethylene-vinyl acetate copolymer film, which is then stretched, a polarizing film containing a polyene orientation film, such as a dehydrated product of polyvinyl alcohol and a dehydrochloration product of polyvinyl chloride, and the like.

The polarizing film used in the first and second laminated polarizing films of the invention preferably has such a structure that the polarizing film is held between a pair of films for protecting the polarizing film (which are hereinafter referred to as protective films).

In the case where the protective film for the polarizing film is present in the polarizing film, the optical anisotropy thereof is preferably as small as possible, and specifically, the in-plane phase retardation value ($R(\lambda)$ value) is preferably 10 nm or less, more preferably 7 nm or less, and most preferably nm or less. The phase retardation value in the thickness direction ($Rth(\lambda)$ value) is preferably 70 nm or less, more preferably 50 nm or less, further preferably 30 nm or less, and most preferably 20 nm or less.

The phase slow axis of the protective film for the polarizing film in the film plane is preferably perpendicular or in parallel to the absorption axis of the polarizing film, and is more preferably in parallel thereto for continuously producing the polarizing film.

Examples of the protective film for the polarizing film include polycarbonate, polystyrene, syndiotactic polystyrene, amorphous polyolefin, a polymer having a norbornene skeleton, an organic acid-substituted cellulose polymer, polyether sulfone, polyarylate, polyester, olefin maleimide, copolymer olefin maleimide having a phenyl group, and the like, and preferably cellulose acetate.

In the laminated polarizing film of the invention, the protective film for the polarizing film may not be used, and the positive optical film in the first laminated polarizing film, or the negative optical film in the second laminated polarizing film may function as the protective film for the polarizing film. According to the constitution, influence of fluctuation due to the optical anisotropy of the protective film for the polarizing film can be avoided to improve the optical performance.

Upon obtaining the first and second laminated polarizing films of the invention, the polarizing film and the optical film may be fixed with an adhesive or the like depending on necessity. Fixation with an adhesive is preferred from the standpoint of prevention of deviation in axis relationship and the like. Upon laminating, for example, a transparent adhesive, such as a polyvinyl alcohol series, a modified polyvinyl alcohol series, an organic silanol series, an acrylic series, a silicone series, a polyester series, a polyurethane series, a polyether series, a rubber series and the like, may be used, and the kind thereof is not particularly limited. From the standpoint of preventing the optical characteristics from being changed, however, an adhesive that does not require a high temperature process upon curing and drying, and an adhesive that does not require a curing treatment or a drying treatment for a prolonged period of time. An adhesive that does not undergo peeling and the like under heating and humidifying conditions is preferred.

In the case where triacetyl cellulose (TAC) is used as the protective film for the polarizing film, an adhesive between TAC and the positive optical film in the first laminated polarizing film or the negative optical film in the second laminated polarizing film is preferably an acrylic pressure-sensitive adhesive formed of an acrylic polymer having a mass average molecular weight of 100,000 or more and a glass transition temperature of 0° C. or less constituted by such a monomer as butyl (meth)acrylate, methyl (meth)acrylate, ethyl (meth)acrylate and (meth)acrylic acid. The acrylic pressure-sensitive adhesive is preferred since it is excellent in transparency, weather resistance, heat resistance and the like.

The adhesive used for lamination may contain, depending on necessity, an appropriate additive, such as a natural or synthetic resin, glass fibers, glass beads, a filler containing inorganic powder or the like, e.g., metallic powder and the like, a pigment, a colorant, an antioxidant, and the like.

The layers of the polarizing film, the optical film, the protective film for the polarizing film, the adhesive layer and the like constituting the first and second laminated polarizing films of the invention may have an ultraviolet ray absorbing capability by such a method as treatment with an ultraviolet ray absorbent, such as a salicylic acid ester compound, a benzophenol compound, a benzotrizaole compound, a cyanoacrylate compound, a nickel complex compound and the like.

By using the first laminated polarizing film or the second laminated polarizing film of the invention in a liquid crystal display device, a liquid crystal display device, particularly a liquid crystal display device having an IPS mode, can be significantly improved in viewing angle characteristics and the like.

The second laminated polarizing film of the invention will be described.

In the second laminated polarizing film, the "positive substantial uniaxiality" means that the orientation index in the thickness direction Nz defined by the expression (5) is Nz=1, and the "positive substantially uniaxial optical film" is defined as the expression (26):

$$0.8 < Nz < 1.2 \quad (26)$$

The orientation index in the thickness direction Nz of the positive substantially uniaxial optical film is preferably $0.9 < Nz < 1.1$, and more preferably $0.95 < Nz < 1.05$.

The "negative optical film" in the second laminated polarizing film is defined by the orientation index in the thickness direction Nz as the expression (27):

$$Nz \leq 0 \quad (27)$$

In the second laminated polarizing film, the state where the slow axis within the film plane of the positive substantially uniaxial optical film and the slow axis within the film plane of the negative optical film are "substantially in parallel" to the absorption axis of the polarizing film means that the angle between the axes is in a range of ±2°, preferably in a range of ±1°, and more preferably in a range of ±0.5°.

For enabling formation of the second laminated polarizing film of the invention capable of improving a viewing angle of a polarizing film by a roll-to-roll process, it is necessary that the positional relationship between the principal orientation direction of polymer main chains of the positive substantially uniaxial optical film and the absorption axis of the polarizing film is substantially in parallel, and the positional relationship between the principal orientation direction of polymer main chains of the negative optical film and the absorption axis of the polarizing film is substantially perpendicular.

In the invention, as having been described above, the "principal orientation direction of polymer main chains" is the principal orientation direction within the film plane where the polymer main chains are oriented statistically most frequently, and in general, can be identified by a combination of an optical measuring method, such as measurement of a refractive index, birefringence index or the like, and a method of analyzing the molecular vibration direction by a dichroic infrared spectroscopy, and the like. In uniaxial stretching, the stretching direction is generally the "principal orientation direction of polymer main chain".

One preferred embodiment of the second laminated polarizing film of the invention is, from the standpoint of improvement in performance, the laminated polarizing film in a roll form, in which the slow axes within the film plane of the positive substantially uniaxial optical film and the negative optical film are substantially in parallel to the longitudinal direction, and the absorption axis of the polarizing film is substantially in parallel to the longitudinal direction.

The state where the slow axes within the film plane of the positive substantially uniaxial optical film and the negative optical film are "substantially in parallel" to the longitudinal direction means that the in-plane slow axes are in a range of ±2°, preferably in a range of ±1°, and more preferably in a range of ±0.5°, with respect to the longitudinal direction being 0°.

Similarly, the state where the in-plane absorption axis of the polarizing film is "substantially in parallel" to the longitudinal direction means that the absorption axis is in a range of ±2°, preferably in a range of ±1°, and more preferably in a range of ±0.5°, with respect to the longitudinal direction being 0°.

A polarizing film exhibiting performance with molecular orientation of an absorptive dichroic substance, such as iodine and the like, having been widely used is generally produced by continuous longitudinal uniaxial stretching for obtaining a high polarization degree, and therefore, the absorption axis thereof is in the longitudinal direction. Accordingly, for obtaining the second laminated polarizing film of the invention by a roll-to-roll process, it is preferred that the slow axes in the film plane of the positive substantially uniaxial optical film and the negative optical film and the absorption axis of the polarizing film are substantially in the longitudinal direction. As a method for obtaining the state of the directions of the axes, it is preferred that the positive substantially uniaxial optical film is produced by longitudinal uniaxial stretching, and the negative optical film is produced by transversal uniaxial stretching.

For obtaining the second laminated polarizing film of the invention that is excellent in performance, the in-plane phase retardation value $R_{POA}(\lambda)$ of the positive substantially uniaxial optical film is preferably in a range of:

$$30 \leq R_{POA}(\lambda) \leq 170 \quad (21)$$

more preferably in a range of:

$$50 \leq R_{POA}(\lambda) \leq 160 \quad (28)$$

further preferably in a range of:

$$80 \leq R_{POA}(\lambda) \leq 150 \quad (29)$$

and particularly preferably in a range of:

$$100 \leq R_{POA}(\lambda) \leq 140 \quad (30)$$

The in-plane phase retardation value $R_{NNZ}(\lambda)$ and the orientation index in the thickness direction Nz defined by the expression (5) of the positive optical film are preferably:

$$20 \leq R_{NNZ}(\lambda) \leq 140 \quad (22)$$

and $$-1 \leq Nz(\lambda) \leq 0 \quad (23)$$

more preferably:

$$30 \leq R_{NNZ}(\lambda) \leq 120 \quad (31)$$

and $$-0.8 \leq Nz(\lambda) \leq -0.1 \quad (32)$$

further preferably:

$$40 \leq R_{NNZ}(\lambda) \leq 110 \quad (33)$$

and $$-0.6 \leq Nz(\lambda) \leq -0.15 \quad (34)$$

and particularly preferably:

$$50 \leq R_{NNZ}(\lambda) \leq 100 \quad (35)$$

and $$-0.5 \leq Nz(\lambda) \leq -0.2 \quad (36)$$

The ranges are determined from the standpoint of the polarization performance, the adequateness to a roll-to-roll process, and the like.

In the second laminated polarizing film of the invention, at least one of the positive substantially uniaxial optical film and the negative optical film preferably has reverse wavelength dispersion characteristics of the phase retardation. The reverse wavelength dispersion characteristics of the phase retardation satisfy the expression (17) defined in the description for the first laminated polarizing film.

In the second laminated polarizing film of the invention, in the case where at least one of the positive substantially uniaxial optical film and the negative optical film has reverse wavelength dispersion characteristics of the phase retardation, a wide bandwidth property can be imparted to the polarizing capability of the laminated polarizing film, and as a specific effect on applying to a liquid crystal display device, the transmittance dispersion can have a wide bandwidth to suppress color shift due to change in viewing angle. While the effect can be obtained when at least one of the optical films has the reverse wavelength dispersion characteristics, it is preferred that both of them have the reverse wavelength dispersion characteristics.

As more preferred reverse wavelength dispersion characteristics, the expressions (18) and (19) defined in the description for the first laminated polarizing film are simultaneously satisfied.

A material for the phase retardation film used in the second laminated polarizing film of the invention is necessarily a thermoplastic polymer, and is preferably non-crystalline at a molding temperature of the film, as similar to the first laminated polarizing film, from the standpoint of moldability and the like.

The thermoplastic polymer having a negative molecular polarizability anisotropy forming the negative optical film used in the second laminated polarizing film is preferably an amorphous polymer from the standpoint of moldability, controllability in phase retardation, and the like, as similar to the first laminated polarizing film. Specific examples thereof include the polymers described in the description for the first laminated polarizing film.

In the second laminated polarizing film, the thermoplastic polymer having a negative molecular polarizability anisotropy is also particularly preferably one containing polycarbonate having a fluorene skeleton. The reasons why it preferably contains a fluorene skeleton are also the same as above.

A preferred chemical structure of the polycarbonate having a fluorene skeleton capable of forming the negative optical film used in the second laminated polarizing film is a polymer or a polymer blend containing a repeating unit represented by the formula (I) described in the description for the first laminated polarizing film.

The polycarbonate material having a fluorene skeleton represented by the formula (I) can be preferably used as the phase retardation film in the second laminated polarizing film of the invention since it has a high glass transition temperature and is excellent in handleability, stretching and molding property, and the like.

A more preferred polycarbonate material capable of forming the negative optical film used in the second laminated polarizing film contains the repeating unit represented by the formula (I) and the repeating unit represented by the formula (II), as similar to the first laminated polarizing film, and the content of the repeating unit represented by the formula (I) based on the total of the repeating units represented by the formulae (I) and (II) is also preferably in the same range as in the first laminated polarizing film.

The polycarbonate copolymer having a fluorene skeleton and/or the polymer blend can be produced by the similar method as described in the description for the first laminated polarizing film.

The thermoplastic polymer having a positive molecular polarizability anisotropy forming the positive substantially uniaxial optical film used in the second laminated polarizing film is preferably an amorphous polymer, as similar to the first laminated polarizing film, from the standpoint of moldability, controllability in phase retardation, and the like. Specific examples thereof include the polymers described in the description for the first laminated polarizing film.

The thermoplastic polymer having a positive molecular polarizability anisotropy in the second laminated polarizing film is also particularly preferably amorphous polyolefin having a norbornene skeleton, and most preferably a thermoplastic polymer that (i) is a copolymer containing ethylene and norbornene, and (ii) has a ratio of the meso configuration and the rasemo configuration of meso/rasemo>4 in the steric configuration of the dyad of the norbornene unit, as similar to the first laminated polarizing film.

Preferred examples of the material forming the positive substantially uniaxial optical film used in the second laminated polarizing film include the copolymer of ethylene and norbornene formed through vinyl polymerization described in the description for the first laminated polarizing film.

The glass transition temperature (Tg), the molar ratio of the repeating units (A) and (B), a vinyl monomer capable of being copolymerized, the molecular weight (reduced viscosity), the ratio of the meso configuration and the rasemo configuration, the production method (e.g., the catalyst, the additive and the like), and the like of the copolymer are similar to the description relating to the ethylene-norbornene copolymer described in the description for the first laminated polarizing film.

The positive substantially uniaxial optical film and the negative optical film used in the second laminated polarizing film of the invention can be produced in the same manner as the production methods of the negative substantially uniaxial optical film and the positive optical film used in the first laminated polarizing film, and such a method may be employed that the thermoplastic polymer is formed into a film and then stretched.

Specific film forming method and stretching method are those described in the description for the first laminated polarizing film.

In the positive substantially uniaxial optical film and the negative optical film used in the second laminated polarizing film, upon forming the unstretched film, fluctuation in thickness is preferably as small as possible.

In the second laminated polarizing film, the thickness in the state of the unstretched film is determined in consideration of an intended phase retardation value and thickness of an optical film after stretching, and is preferably in a range of from 10 to 400 μm, more preferably in a range of from 30 to 300 μm, and further preferably in a range of from 40 to 150 μm, as similar to the first laminated polarizing film.

As the stretching method for stretching the resulting unstretched film uniaxially or biaxially, the same method as described for the first laminated polarizing film may be employed.

In the second laminated polarizing film of the invention, the positive substantially uniaxial optical film is preferably produced as a longitudinally uniaxially stretched film. According to the constitution, a positive substantially uniaxial optical film in a roll form having a slow axis in a direction substantially perpendicular to the longitudinal direction within the film plane can be produced. The negative optical film is preferably produced as a transversally uniaxially stretched film. According to the constitution, a negative optical film in a roll form having a slow axis in a direction substantially in the longitudinal direction within the film plane can be produced. By using them and a polarizing film having an absorption axis in the longitudinal direction, the second laminated polarizing film of the invention can be produced by a roll-to-roll process.

The positive substantially uniaxial optical film and the negative optical film used in the second laminated polarizing film of the invention may further contain a low molecular weight additive, such as an ultraviolet ray absorbent, e.g., phenylsalicylic acid, 2-hydroxybenzophenone, triphenyl phosphate and the like, a bluing agent for changing color tone, an antioxidant and the like, as similar to the first laminated polarizing film.

EXAMPLES

The invention will be described below with reference to examples, but the invention is not limited thereto.
(Methods of Measurement and Evaluation)
The characteristic values of the materials described in the specification are those obtained by the following evaluation methods.
(1) Thickness of Film
It was measured with an electronic microthickness meter (produced by Anritsu Company).
(2) In-Plane Phase Retardation Value (R(λ) Value) (nm),
Phase Retardation Value in Thickness Direction (Rth(λ) value) (nm), and
Orientation Index in Thickness Direction (Nz)
The in-plane Phase Retardation Value (R(λ) value), the phase retardation value in the thickness direction (Rth(λ) value), and the orientation index in the thickness direction (Nz) were obtained by measuring with a spectroscopic ellipsometer (M150, a trade name, produced by JASCO Corporation). The R value was measured in the state where the incident light was perpendicular to the film surface. Upon obtaining the Nz value and the Rth value, while changing the angle between the incident light and the film surface, the phase retardation values at each angle were measured, and curve fitting was carried out by using a known expression of an optical indicatrix to effect numeric operations of the three-dimensional refractive indices $n_x$, $n_y$ and $n_z$. In this case, an average refractive index n was necessarily used as another parameter, and a value measured with an Abbe refractometer (Abbe Refractometer 2-T, a trade name, produced by Atago Co., Ltd.) was used therefor. The measurement and operation results were substituted into the expressions (4), (5) and (20) to obtain the values. In the following expressions, d represents the thickness (nm):

$$R=(n_x-n_y) \times d \quad (4)$$

$$Nz=(n_x-n_z)/(n_x-n_y) \quad (5)$$

$$Rth(\lambda)=\{(n_x+n_y)/2-n_z\} \times d \quad (20)$$

(3) Glass Transition Temperature (Tg)
It was measured with a differential scanning calorimeter (DSC2920 Modulated DSC, a trade name, produced by TA Instruments). The measurement of a polymer was carried out in a state of flakes or chips after polymerization, but not after forming into a film.
(4) Total Light Transmittance and Haze Value of Film
They were measured with a turbidity meter (Model NDH-2000, produced by Nippon Denshoku Industries Co., Ltd.).
(5) Evaluation of Viewing Angle of Liquid Crystal Display Device
A liquid crystal cell was obtained by removing all the polarizing films and the phase retardation films from a liquid crystal cell used in an IPS liquid crystal television set, "WOOO W32 L7000", a trade name, produced by Hitachi, Ltd. The resulting laminated polarizing film was adhered to the liquid crystal cell by using an acrylic adhesive, and the viewing angle characteristics were evaluated. Upon evaluation, a transmittance spectrum was measured with a spectrometer (MCPD7000, a trade name, produced by Otsuka Electronics Co., Ltd.).

In Examples and Comparative Examples, the transmittance spectrum in a black state was measured at an incident angle of 60° and an azimuthal angle or 45°, and the definition of the azimuthal angle was described in FIGS. 1 to 4 and FIGS. 6 to 9. The polar angle was defined as an angle between the surface of the liquid crystal display device and the normal line direction.
(Production of Optical Films)
(1) Production of Positive Optical Film Containing Thermoplastic Polymer Having Positive Molecular Polarizability Anisotropy
(1-1) Amorphous Polyolefin (APO) Film
(Film Material)
As a resin material for the film, "TOPAS 6013", a trade name, produced by Ticona, Inc. (a cycloolefin copolymer formed by copolymerizing ethylene and norbornene with a metallocene catalyst, ratio of meso configuration and rasemo configuration: meso/rasemo=0.36/0.04=9, ratio of NN dyad (molar fraction): 0.40, molar ratio of ethylene component and norbornene component: (A)/(B)=50/50, reduced viscosity ηsp/c: 0.80 dL/g) was used.
(Formation of Unstretched Film)
Pellets of the thermoplastic polymer were melt-extruded through a T-die having a width of 15 cm by using a biaxial melt extruder and continuously wound with a cooling roller to form an unstretched film. The film forming conditions were a cylinder temperature of 260° C., a T-die temperature of 270° C. and a cooling roller temperature of 145° C.

The resulting film was in a roll form, and the film was excellent in transparency and homogeneity and good in surface property. The film had an average thickness of 100 µm except for both end parts of 2.5 cm in width of the film. The film had a glass transition temperature (Tg) of 138° C., a total light transmittance of 91.5% and a haze of 0.3%.
(Production of Stretched Film)
The unstretched film thus obtained was subjected to transversal uniaxial stretching by a continuous tenter method. At this time, the stretching temperature was 145° C., and the stretching ratio was controlled to provide positive optical films having film properties disclosed in Examples 1, 2 and 3 in Table 1.
(1-2) Copolymer Polycarbonate Film
(Film Material)
As a film material, a copolymer polycarbonate having a fluorene skeleton was used. Polymerization of the polycarbonate was carried out by a known interface polycondensation method using phosgene. A sodium hydroxide aqueous solution and ion exchanged water were charged in a reaction tank equipped with a stirrer, a thermometer and a reflux condenser, in which the monomers [K] and [L] having the following structures in a molar ratio of 67/33 were dissolved, and a small amount of hydrosulfite was added thereto. Methylene chloride was then added to the resulting solution, and phosgene was blown into the solution at 20° C. over about 60 minutes. After emulsifying by adding p-tert-butylphenol thereto, triethylamine was added thereto, followed by stirring at 30° C. for about 3 hours, to complete the reaction. After completing the reaction, an organic phase was fractionated, and methylene chloride was evaporated to obtain a polycarbonate copolymer. The resulting copolymer had a compositional ratio that was substantially the same as the charging ratio.

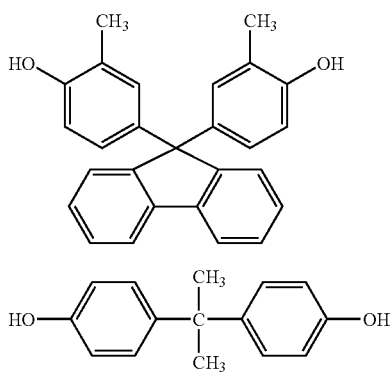

[K]

[L]

(Formation of Unstretched Film)

The resulting copolymer was dissolved in methylene chloride to prepare a dope solution having a solid concentration of 18% by mass. A cast film was produced with the dope solution to obtain an unstretched film. The unstretched film had a thickness of 130 μm and a remaining solvent amount of 0.9% by mass.

(Production of Stretched Film)

The film thus obtained was subjected to transversal uniaxial stretching by a continuous tenter method at a stretching temperature of 225° C. by setting a stretching ratio providing phase retardation values disclosed in Examples 4 and 5 in Table 1 to provide positive optical films. The resulting film had a thickness of 75 μm.

(2) Production of Negative Substantially Uniaxial Optical Film Containing Thermoplastic Polymer Having Negative Molecular Polarizability Anisotropy (2-1) Copolymer Polycarbonate Film (Film Material)

As a film material, a copolymer polycarbonate having a fluorene skeleton was used. Polymerization of the polycarbonate was carried out by a known interface polycondensation method using phosgene. A sodium hydroxide aqueous solution and ion exchanged water were charged in a reaction tank equipped with a stirrer, a thermometer and a reflux condenser, in which the monomer [K] having the aforementioned structure and the monomer [M] having the following structure in a molar ratio of 85/15 were dissolved, and a small amount of hydrosulfite was added thereto. Methylene chloride was then added to the resulting solution, and phosgene was blown into the solution at 20° C. over about 60 minutes. After emulsifying by adding p-tert-butylphenol thereto, triethylamine was added thereto, followed by stirring at 30° C. for about 3 hours, to complete the reaction. After completing the reaction, an organic phase was fractionated, and methylene chloride was evaporated to obtain a polycarbonate copolymer. The resulting copolymer had a compositional ratio that was substantially the same as the charging ratio.

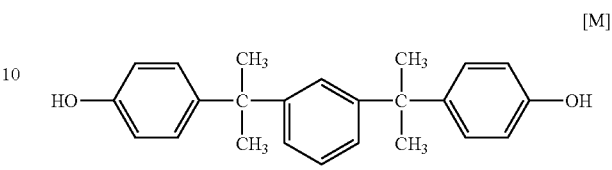

[M]

(Formation of Unstretched Film)

The resulting copolymer was dissolved in methylene chloride to prepare a dope solution having a solid concentration of 18% by mass. A cast film was produced with the dope solution to obtain an unstretched film. The unstretched film had a thickness of 100 μm and a remaining solvent amount of 1.1% by mass.

(Production of Stretched Film)

The film thus obtained was subjected to continuous longitudinal uniaxial stretching at a stretching temperature of 226° C. by setting a stretching ratio providing phase retardation values disclosed in Examples 1, 2, 3 and 4 in Table 1 to provide negative substantially uniaxial optical films.

(2-2) Film of Blend of Polyphenylene Oxide and Polystyrene (Film Material)

As a film material, atactic polystyrene (Mn=90,900, Mw=243,000) and poly(2,6-dimethyl-1,4-phenylene oxide) (Mn=6,200, Mw=42,500) (referred to as polyphenylene oxide) were used.

(Formation of Unstretched Film)

Atactic polystyrene and polyphenylene oxide were kneaded in a biaxial melt extruder, melt-extruded through a T-die having a width of 15 cm and continuously wound with a cooling roller to form an unstretched film. The film forming conditions were a cylinder temperature of 250° C., a T-die temperature of 260° C. and a cooling roller temperature of 135° C. The contents of atactic polystyrene and phenylene oxide were 75% by mass and 25% by mass, respectively, and it was confirmed that the mixture was a compatible blend by thermal analysis. The resulting unstretched film had a thickness of 140 μm.

(Production of Stretched Film)

The unstretched film thus obtained was subjected to continuous longitudinal uniaxial stretching at a stretching temperature of 150° C. by setting a stretching ratio providing a phase retardation value disclosed in Example 5 in Table 1 to provide a negative substantially uniaxial optical film.

(3) Production of Positive Substantially Uniaxial Optical Film Containing Thermoplastic Polymer Having Positive Molecular Polarizability Anisotropy (3-1) Amorphous Polyolefin (APO) Film (Film Material)

As a material for the film, the same material as used in the amorphous polyolefin (APO) film (1-1) in production of the positive optical film containing a thermoplastic polymer having a positive molecular polarizability anisotropy (1) was used.

(Formation of Unstretched Film)

The same unstretched film (thickness: 100 μm in average, glass transition temperature (Tg): 138° C., total light transmittance: 91.5%, haze: 0.3%) was produced in the same manner as in the amorphous polyolefin (APO) film (1-1) in production of the positive optical film containing a thermoplastic polymer having a positive molecular polarizability anisotropy (1).
(Production of Stretched Film)
The unstretched film thus obtained was subjected to continuous longitudinal uniaxial stretching. At this time, the stretching temperature was 145° C., and the stretching ratio was controlled to provide positive substantially uniaxial optical films having film properties disclosed in Examples 6, 7 and 8 in Table 2.
(3-2) Copolymer Polycarbonate Film
(Film Material)
As a material for the film, the same material as used in the copolymer polycarbonate film (1-2) in production of the positive optical film containing a thermoplastic polymer having a positive molecular polarizability anisotropy (1) was used.
(Formation of Unstretched Film)
The same unstretched film (thickness: 130 µm, remaining solvent amount: 0.9% by mass) was produced in the same manner as in the copolymer polycarbonate film (1-2) in production of the positive optical film containing a thermoplastic polymer having a positive molecular polarizability anisotropy (1).
(Production of Stretched Film)
The film thus obtained was subjected to continuous longitudinal uniaxial stretching at a stretching temperature of 225° C. by setting a stretching ratio providing phase retardation values disclosed in Examples 9 and 10 in Table 2 to provide positive substantially uniaxial optical films. The resulting films had a thickness of 75 µm.
(4) Production of Negative Optical Film Containing Thermoplastic Polymer Having Negative Molecular Polarizability Anisotropy
(4-1) Copolymer Polycarbonate Film
(Film Material)
As a material for the film, the same material as used in the copolymer polycarbonate film (2-1) in production of the negative substantially uniaxial optical film containing a thermoplastic polymer having a negative molecular polarizability anisotropy (2) was used.
(Formation of Unstretched Film)
The same unstretched film (thickness: 100 µm, remaining solvent amount: 1.1% by mass) was produced in the same manner as in the copolymer polycarbonate film (2-1) in production of the negative substantially uniaxial optical film containing a thermoplastic polymer having a negative molecular polarizability anisotropy (2).
(Production of Stretched Film)
The film thus obtained was subjected to transversal uniaxial stretching by a continuous tenter method at a stretching temperature of 226° C. by setting a stretching ratio providing phase retardation values disclosed in Examples 6, 7, 8 and 9 in Table 2 to provide negative optical films.
(4-2) Film of Blend of Polyphenylene Oxide and Polystyrene
(Film Material)
As a material for the film, the same material as used in the film of a blend of polyphenylene oxide and polystyrene (2-2) in production of the negative substantially uniaxial optical film containing a thermoplastic polymer having a negative molecular polarizability anisotropy (2) was used.
(Formation of Unstretched Film)
The unstretched film (thickness: 140 µm) was produced in the same manner as in the film of a blend of polyphenylene oxide and polystyrene (2-2) in production of the negative substantially uniaxial optical film containing a thermoplastic polymer having a negative molecular polarizability anisotropy (2).

(Production of Stretched Film)
The unstretched film thus obtained was subjected to transversal uniaxial stretching by a continuous tenter method at a stretching temperature of 150° C. by setting a stretching ratio providing a phase retardation value disclosed in Example 5 in Table 2 to provide a negative optical film.
(5) Production of Polarizing Film
A commercially available polyvinyl alcohol film having a thickness of 75 µm was swollen in pure water and dyed with a mixed aqueous solution of iodine and potassium iodide. Thereafter, the film was crosslinked with boric acid and stretched by 4 times, followed by drying at 50° C., to provide a polarizing film having dichroic absorption capability. The resulting polarizing film had a thickness of 25 µm.

Example 1

FIG. 1 shows an arrangement of an optical element in Example 1. In FIG. 1, numeral 1 denotes a polarizing film on the observer side, 2 denotes a laminated polarizing film on the light source side (first laminated polarizing film of the invention), 3 denotes a protective film, 4 denotes a polarizing film, 5 denotes a triacetyl cellulose film (TAC1), 6 denotes an IPS liquid crystal cell, 7 denotes a negative substantially uniaxial optical film, 8 denotes a positive optical film, 9 denotes a polarizing film, 10 denotes a protective film, 11 denotes a backlight (light source), 12 denotes an absorption axis, 13 denotes a phase slow axis, 14 denotes a phase slow axis (liquid crystal orientation axis), 15 denotes a phase slow axis, 16 denotes a phase slow axis, and 17 denotes an absorption axis.
(Production of Laminated Polarizing Film on Light Source Side (First Laminated Polarizing Film of the Invention) 2)
In production of the laminated polarizing film on the light source side (first laminated polarizing film of the invention) 2 shown in FIG. 1, a triacetyl cellulose film having a thickness of 80 µm having been saponified, which was disposed outside the polarizing film 9 as viewed from the IPS liquid crystal cell 6 and functioned as the protective film 10 for the polarizing film 9, was adhered to the polarizing film 9 with an adhesive containing polyvinyl alcohol having glyoxal added thereto by lamination in a roll-to-roll process.
The positive optical film 8 containing the amorphous polyolefin (APO) having the optical characteristics shown in Table 1 produced in the item (1-1), which had been subjected to a corona treatment on the surface thereof, was then similarly adhered to the surface of the polarizing film 9 opposite to the protective film 10 with a water-soluble polyurethane adhesive by a roll-to-roll process.
The negative substantially uniaxial optical film 7 containing the copolymer polycarbonate having the optical characteristics shown in Table 1 produced in the item (2-1) was subjected to a corona treatment and adhered to the surface of the positive optical film 8 by lamination in a roll-to-roll process, so as to provide the laminated polarizing film on the light source side (first laminated polarizing film of the invention) 2.
In the laminated polarizing film on the light source side (first laminated polarizing film of the invention) 2 thus obtained, the principal orientation direction of polymer main chains of the negative substantially uniaxial optical film 7 and the absorption axis of the polarizing film 9 were in parallel to each other, and the principal orientation direction of polymer main chains of the positive optical film 8 and the absorption axis of the polarizing film 9 were perpendicular to each other.
(Production of Polarizing Film on Observer Side 1)
In production of the polarizing film on the observer side 1 shown in FIG. 1, a triacetyl cellulose film having a thickness of 80 µm having been saponified, which was disposed outside the polarizing film 4 as viewed from the IPS liquid crystal cell 6 and functioned as the protective film 3 for the polarizing film 4, was adhered to the polarizing film 4 with an adhesive containing polyvinyl alcohol having glyoxal added thereto by lamination in a roll-to-roll process.

The triacetyl cellulose film (TAC1) 5 having the optical characteristics shown in Table 1 and a thickness of 80 µm, which had been subjected to a saponification treatment, was then similarly adhered to the opposite surface of the polarizing film 4 by a roll-to-roll process to provide the polarizing film on the observer side 1.

(Evaluation of Viewing Angle of Liquid Crystal Display Device)

A liquid crystal display device was produced by using the laminated polarizing film on the light source side (first laminated polarizing film of the invention) 2 and the polarizing film on the observer side 1, which had been obtained above, the IPS liquid crystal cell 6 and the backlight 11, according the constitution disclosed in FIG. 1, and evaluated for viewing angle characteristics. The evaluation results are shown in FIG. 5.

Figure 5:
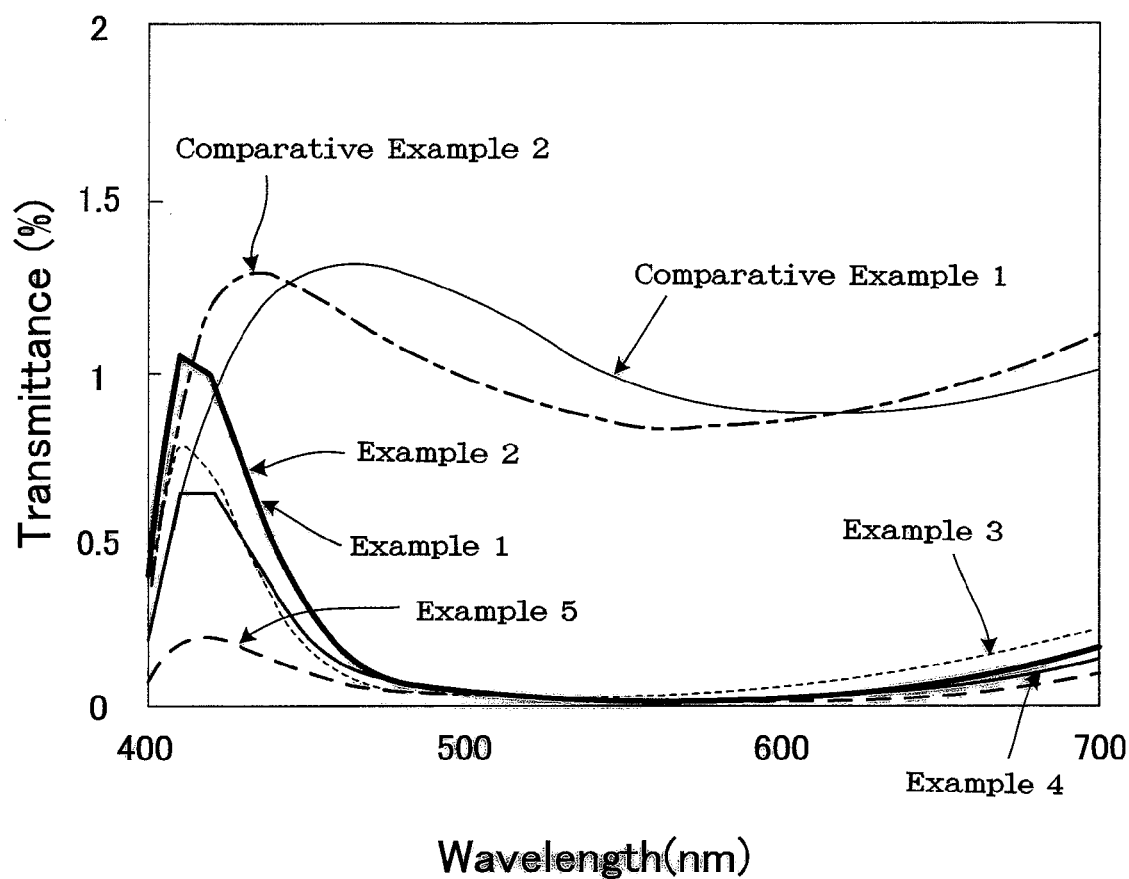
FIG. 5 is transmittance spectra in a black state at an incident angle of 60° and an azimuthal angle of 45° of liquid crystal display devices in Examples 1 to 5 and Comparative Examples 1 and 2.

As shown in FIG. 5, it was found that the liquid crystal display device produced in Example 1 had a transmittance of less than 0.5% at from 450 to 650 nm, in which a human had high visibility, and thus had an effect of enhancing the viewing angle. As a result of visual observation of the black state, it was confirmed that change in brightness depending on viewing angle was small, and the viewing angle was significantly enhanced.

Example 2

Figure 2:
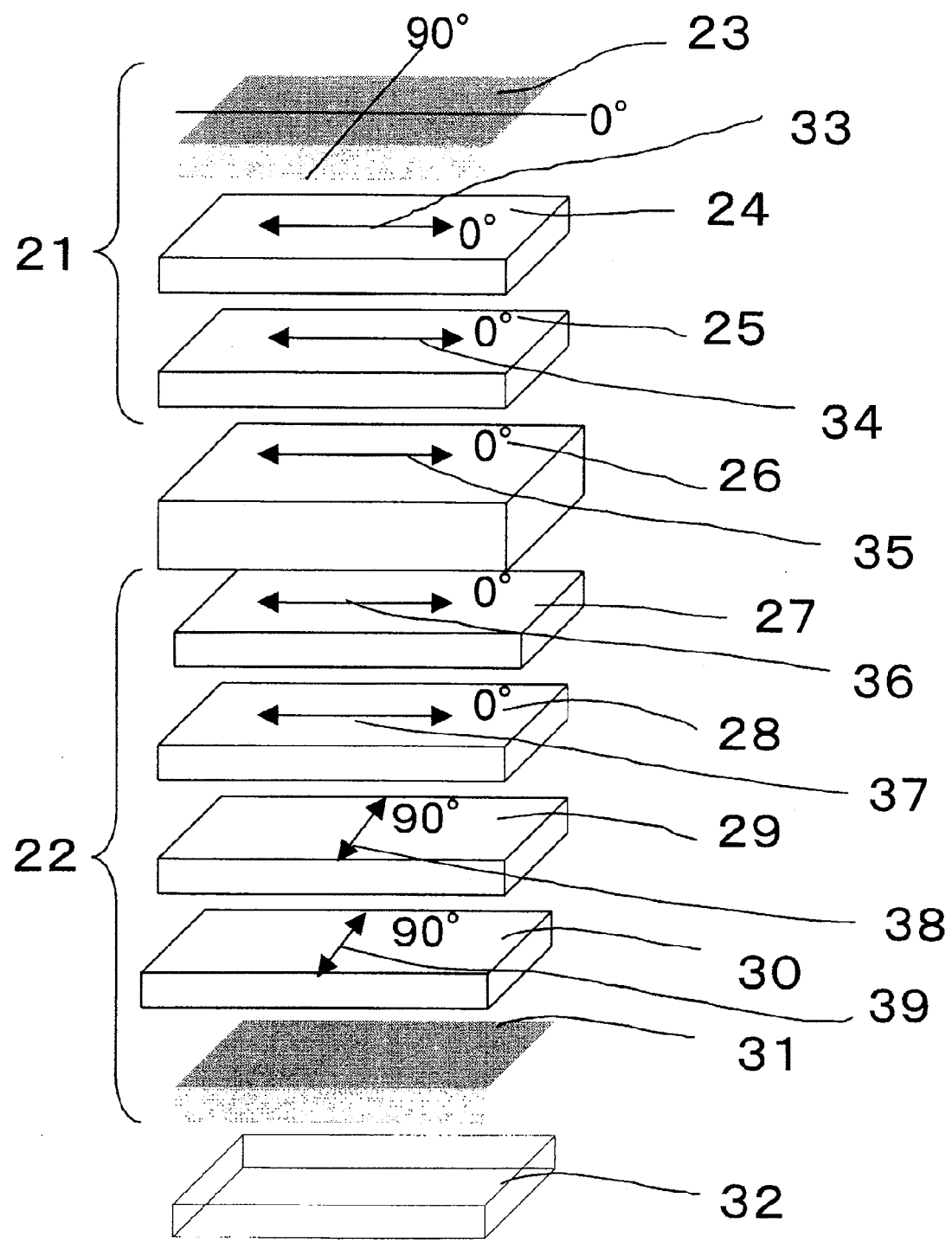
FIG. 2 is an arrangement view of optical elements in Example 2. The angles in the figure show azimuthal angles. Adhesion layers and tackiness agent layers between the optical elements are omitted.

FIG. 2 shows an arrangement of an optical element in Example 2. In FIG. 2, numeral 21 denotes a polarizing film on the observer side, 22 denotes a laminated polarizing film on the light source side (first laminated polarizing film of the invention), 23 denotes a protective film, 24 denotes a polarizing film, 25 denotes a triacetyl cellulose film (TAC1), 26 denotes an IPS liquid crystal cell, 27 denotes a negative substantially uniaxial optical film, 28 denotes a positive optical film, 29 denotes a triacetyl cellulose film (TAC2), 30 denotes a polarizing film, 31 denotes a protective film, 32 denotes a backlight (light source), 33 denotes an absorption axis, 34 denotes a phase slow axis, 35 denotes a phase slow axis (liquid crystal orientation axis), 36 denotes a phase slow axis, 37 denotes a phase slow axis, 38 denotes a phase slow axis, and 39 denotes an absorption axis.

(Production of Laminated Polarizing Film on Light Source Side (First Laminated Polarizing Film of the Invention) 22)

In production of the laminated polarizing film on the light source side (first laminated polarizing film of the invention) 22 shown in FIG. 2, a triacetyl cellulose film having a thickness of 80 µm having been saponified, which was disposed outside the polarizing film 30 as viewed from the IPS liquid crystal cell 26 and functioned as the protective film 31 for the polarizing film 30, was adhered to the polarizing film 30 with an adhesive containing polyvinyl alcohol having glyoxal added thereto by lamination in a roll-to-roll process.

The triacetyl cellulose film (TAC2) 29 having the optical characteristics shown in Table 1 and a thickness of 80 µm, which had been subjected to a saponification treatment, was then similarly adhered to the opposite surface of the polarizing film 30 by a roll-to-roll process.

The positive optical film 28 containing the amorphous polyolefin (APO) having the optical characteristics shown in Table 1 produced in the item (1-1), which had been subjected to a corona treatment on the surface thereof, was then similarly adhered to the surface of the triacetyl cellulose film (TAC2) 29 with an acrylic adhesive by lamination in a roll-to-roll process.

The negative substantially uniaxial optical film 27 containing the copolymer polycarbonate having the optical characteristics shown in Table 1 produced in the item (2-1) and the positive optical film 28 were adhered to each other by a roll-to-roll process to provide the laminated polarizing film on the light source side (first laminated polarizing film of the invention) 22.

In the laminated polarizing film on the light source side (first laminated polarizing film of the invention) 22 thus obtained, the principal orientation direction of polymer main chains of the negative substantially uniaxial optical film 27 and the absorption axis of the polarizing film 30 were in parallel to each other, and the principal orientation direction of polymer main chains of the positive optical film 28 and the absorption axis of the polarizing film 30 were perpendicular to each other.

(Production of Polarizing Film on Observer Side 21)

The polarizing film on the observer side 21 was produced in the same manner as the polarizing film on the observer side 1 in Example 1.

(Evaluation of Viewing Angle of Liquid Crystal Display Device)

A liquid crystal display device was produced by using the laminated polarizing film on the light source side (first laminated polarizing film of the invention) 22 and the polarizing film on the observer side 21, which had been obtained above, the IPS liquid crystal cell 26 and the backlight 32, according the constitution disclosed in FIG. 2, and evaluated for viewing angle characteristics. The evaluation results are shown in FIG. 5.

As shown in FIG. 5, it was found that the liquid crystal display device produced in Example 2 had a transmittance of less than 0.5% at from 450 to 650 nm, in which a human had high visibility, and thus had an effect of enhancing the viewing angle. As a result of visual observation of the black state, it was confirmed that change in brightness depending on viewing angle was small, and the viewing angle was significantly enhanced.

Example 3

In Example 3, an optical element having an arrangement shown in FIG. 1 was produced as similar to Example 1.

(Production of Laminated Polarizing Film on Light Source Side (First Laminated Polarizing Film of the Invention) 2)

The laminated polarizing film on the light source side (first laminated polarizing film of the invention) 2 was produced in the same manner as in Example 1 except that the positive optical film containing the amorphous polyolefin (APO) produced in the item (1-1) and the negative substantially uniaxial optical film containing the copolymer polycarbonate produced in the item (2-1), having the optical characteristics shown in Table 1, were used.

(Production of Polarizing Film on Observer Side 1)

The polarizing film on the observer side 1 was produced in the same manner as the polarizing film on the observer side 1 in Example 1.

(Evaluation of Viewing Angle of Liquid Crystal Display Device)

A liquid crystal display device was produced by using the laminated polarizing film on the light source side (first laminated polarizing film of the invention) 2 and the polarizing film on the observer side 1, which had been obtained above, the IPS liquid crystal cell 6 and the backlight 11, according the constitution disclosed in FIG. 1, and evaluated for viewing angle characteristics. The evaluation results are shown in FIG. 5.

As shown in FIG. 5, it was found that the liquid crystal display device produced in Example 3 had a transmittance of less than 0.5% at from 450 to 650 nm, in which a human had high visibility, and thus had an effect of enhancing the viewing angle. As a result of visual observation of the black state, it was confirmed that change in brightness depending on viewing angle was small, and the viewing angle was significantly enhanced.

Example 4

In Example 4, an optical element having an arrangement shown in FIG. 1 was produced as similar to Example 1.
(Production of Laminated Polarizing Film on Light Source Side (First Laminated Polarizing Film of the Invention) 2)

The laminated polarizing film on the light source side (first laminated polarizing film of the invention) 2 was produced in the same manner as in Example 1 except that the positive optical film containing the copolymer polycarbonate produced in the item (1-2) and the negative substantially uniaxial optical film containing the copolymer polycarbonate produced in the item (2-1), having the optical characteristics shown in Table 1, were used.
(Production of Polarizing Film on Observer Side 1)

The polarizing film on the observer side 1 was produced in the same manner as the polarizing film on the observer side 1 in Example 1.
(Evaluation of Viewing Angle of Liquid Crystal Display Device)

A liquid crystal display device was produced by using the laminated polarizing film on the light source side (first laminated polarizing film of the invention) 2 and the polarizing film on the observer side 1, which had been obtained above, the IPS liquid crystal cell 6 and the backlight 11, according the constitution disclosed in FIG. 1, and evaluated for viewing angle characteristics. The evaluation results are shown in FIG. 5.

As shown in FIG. 5, it was found that the liquid crystal display device produced in Example 4 had a transmittance of less than 0.5% at from 450 to 650 nm, in which a human had high visibility, and thus had an effect of enhancing the viewing angle. As a result of visual observation of the black state, it was confirmed that change in brightness depending on viewing angle was small, and the viewing angle was significantly enhanced.

Example 5

In Example 5, an optical element having an arrangement shown in FIG. 1 was produced as similar to Example 1.
(Production of Laminated Polarizing Film on Light Source Side (First Laminated Polarizing Film of the Invention) 2)

The laminated polarizing film on the light source side (first laminated polarizing film of the invention) 2 was produced in the same manner as in Example 1 except that the positive optical film containing the copolymer polycarbonate produced in the item (1-2) and the negative substantially uniaxial optical film containing the blend of polyphenylene oxide and polystyrene produced in the item (2-2), having the optical characteristics shown in Table 1, were used.

(Production of Polarizing Film on Observer Side 1)
The polarizing film on the observer side 1 was produced in the same manner as the polarizing film on the observer side 1 in Example 1.
(Evaluation of Viewing Angle of Liquid Crystal Display Device)

A liquid crystal display device was produced by using the laminated polarizing film on the light source side (first laminated polarizing film of the invention) 2 and the polarizing film on the observer side 1, which had been obtained above, the IPS liquid crystal cell 6 and the backlight 11, according the constitution disclosed in FIG. 1, and evaluated for viewing angle characteristics. The evaluation results are shown in FIG. 5.

As shown in FIG. 5, it was found that the liquid crystal display device produced in Example 5 had a transmittance of less than 0.5% at from 450 to 650 nm, in which a human had high visibility, and thus had an effect of enhancing the viewing angle. As a result of visual observation of the black state, it was confirmed that change in brightness depending on viewing angle was small, and the viewing angle was significantly enhanced.

Comparative Example 1

Figure 3:
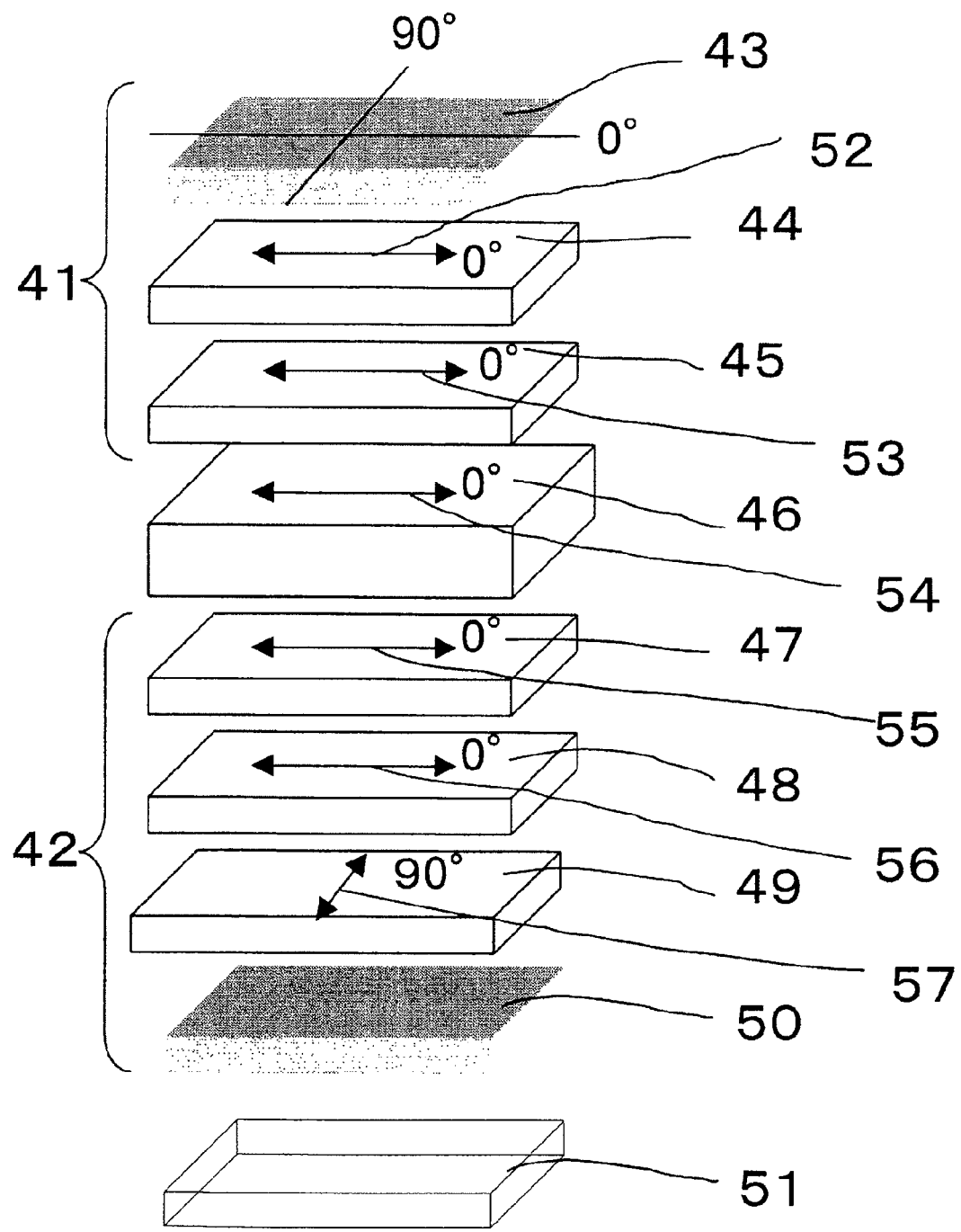
FIG. 3 is an arrangement view of optical elements in Comparative Example 1. The angles in the figure show azimuthal angles. Adhesion layers and tackiness agent layers between the optical elements are omitted.

FIG. 3 shows an arrangement of an optical element in Comparative Example 1. In FIG. 3, numeral 41 denotes a polarizing film on the observer side, 42 denotes a laminated polarizing film on the light source side, 43 denotes a protective film, 44 denotes a polarizing film, 45 denotes a triacetyl cellulose film (TAC1), 46 denotes an IPS liquid crystal cell, 47 denotes a positive optical film, 48 denotes a negative substantially uniaxial optical film, 49 denotes a polarizing film, 50 denotes a protective film, 51 denotes a backlight (light source), 52 denotes an absorption axis, 53 denotes a phase slow axis, 54 denotes a phase slow axis (liquid crystal orientation axis), 55 denotes a phase slow axis, 56 denotes a phase slow axis, and 57 denotes an absorption axis. (Production of Laminated Polarizing Film on Light Source Side 42)

The laminated polarizing film on the light source side 42 was produced in the same manner as in Example 1 except that the order of lamination of the two phase retardation films in the laminated polarizing film on the light source side 42 was reversed. The two optical films used had the same optical characteristics as in Example 1.
(Production of Polarizing Film on Observer Side 41)

The polarizing film on the observer side 41 was produced in the same manner as the polarizing film on the observer side 1 in Example 1.
(Evaluation of Viewing Angle of Liquid Crystal Display Device)

A liquid crystal display device was produced by using the laminated polarizing film on the light source side 42 and the polarizing film on the observer side 41, which had been obtained above, the IPS liquid crystal cell 46 and the backlight 51, according the constitution disclosed in FIG. 3, and evaluated for viewing angle characteristics. The evaluation results are shown in FIG. 5.

As shown in FIG. 5, it was found that the liquid crystal display device produced in Comparative Example 1 had a higher transmittance than those of Examples, in particular, has a transmittance of about 1% or more at from 450 to 650 nm, in which a human had high visibility, and thus had no effect of enhancing the viewing angle. As a result of visual observation of the black state, it was confirmed that change in brightness and change in color depending on viewing angle were significantly large as compared to those of Examples, and it was difficult to produce a liquid crystal display device excellent in viewing angle.

Comparative Example 2

Figure 4:
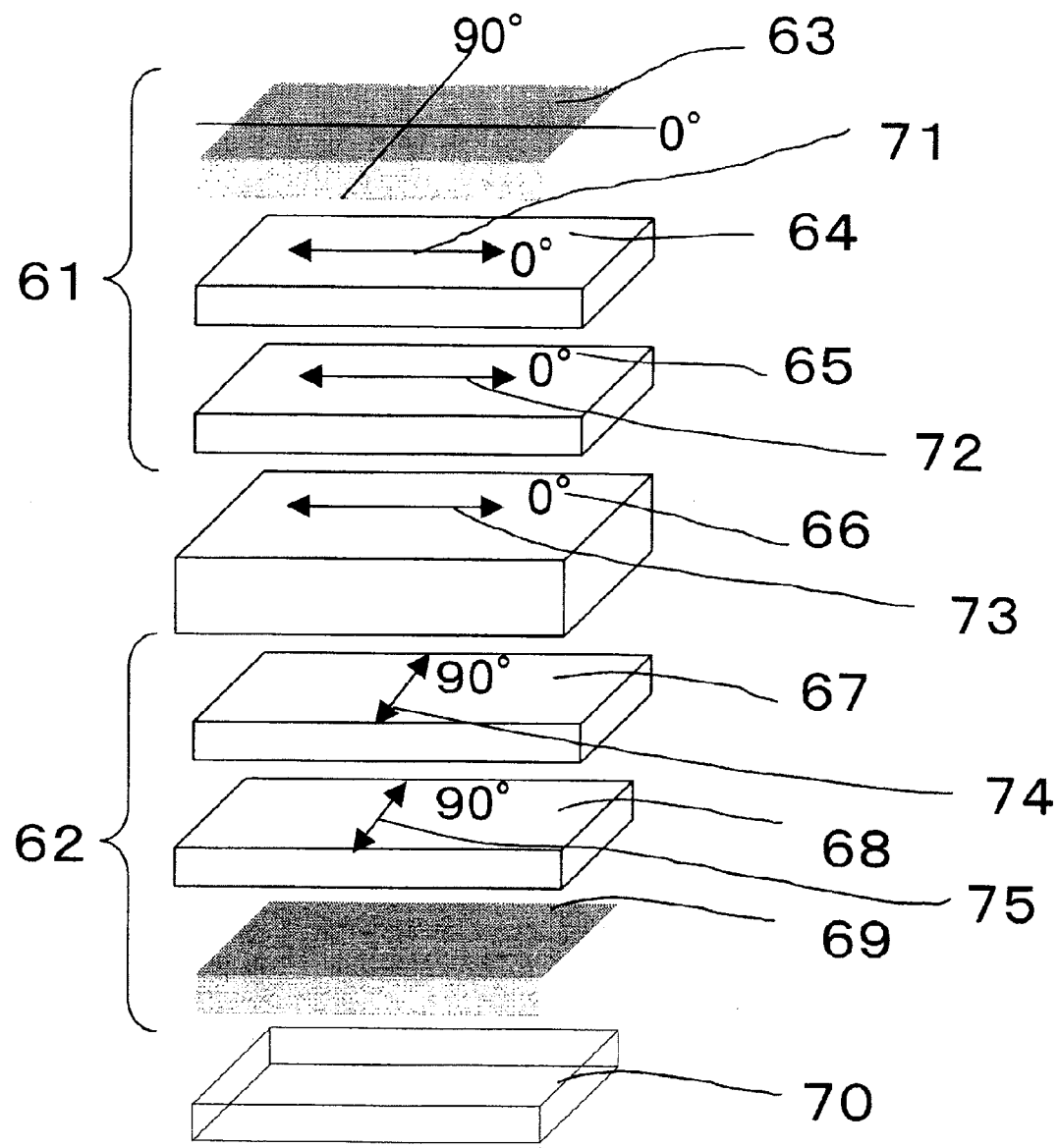
FIG. 4 is an arrangement view of optical elements in Comparative Example 2. The angles in the figure show azimuthal angles. Adhesion layers and tackiness agent layers between the optical elements are omitted.

FIG. 4 shows an arrangement of an optical element in Comparative Example 2. In FIG. 4, numeral 61 denotes a polarizing film on the observer side, 62 denotes a polarizing film on the light source side, 63 denotes a protective film, 64 denotes a polarizing film, 65 denotes a triacetyl cellulose film (TAC1), 66 denotes an IPS liquid crystal cell, 67 denotes a triacetyl cellulose film (TAC2), 68 denotes a positive optical film, 69 denotes a protective film, 70 denotes a backlight (light source), 71 denotes an absorption axis, 72 denotes a phase slow axis, 73 denotes a phase slow axis (liquid crystal orientation axis), 74 denotes a phase slow axis, and 75 denotes an absorption axis.

(Production of Laminated Polarizing Film on Light Source Side 62)

The polarizing film on the light source side 62 was produced in the same manner as in the production of the polarizing film on the observer side 1 in Example 1 by using the triacetyl cellulose film (TAC1) having the optical characteristics shown in Table 1 used in Example 1.

(Production of Polarizing Film on Observer Side 61)

The polarizing film on the observer side 61 was produced in the same manner as the polarizing film on the observer side 1 in Example 1.

(Evaluation of Viewing Angle of Liquid Crystal Display Device)

A liquid crystal display device was produced by using the laminated polarizing film on the light source side 62 and the polarizing film on the observer side 61, which had been obtained above, the IPS liquid crystal cell 66 and the backlight 70, according the constitution disclosed in FIG. 4, and evaluated for viewing angle characteristics. The evaluation results are shown in FIG. 5.

As shown in FIG. 5, it was found that the liquid crystal display device produced in Comparative Example 2 had a higher transmittance than those of Examples, in particular, has a transmittance of about 1% or more at from 450 to 650 nm, in which a human had high visibility, and thus had a narrow viewing angle.

TABLE 1

|  | Example 1 | Example 2 | Example 3 | Example 4 | Example 5 |
|---|---|---|---|---|---|
| $R_{NEA}(450)$ | 152 | 155 | 141 | 146 | 98 |
| $R_{NEA}(550)$ | 126 | 128 | 117 | 121 | 116 |
| $R_{PNZ}(450)$ | 51 | 40 | 49 | 49 | 51 |
| $R_{PNZ}(550)$ | 50 | 39 | 48 | 60 | 62 |
| $Nz_{NEA}(550)$ | 0 | 0 | 0 | 0 | 0 |
| $Nz_{PNZ}(550)$ | 1.3 | 1.3 | 1.3 | 1.2 | 1.2 |
| $R_{TAC1}(550)$ | 1 | 1 | 1 | 1 | 1 |
| $Rth_{TAC1}(550)$ | 13 | 13 | 13 | 13 | 13 |
| $R_{TAC2}(550)$ | none | 1 | none | none | none |
| $Rth_{TAC2}(550)$ | none | 13 | none | none | none |

$R_{NEA}(450)$, $R_{NEA}(550)$: in-plane phase retardation values of negative substantially uniaxial optical film at measurement wavelength of 450 nm and 550 nm, respectively $R_{PNZ}(450)$, $R_{PNZ}(550)$: in-plane phase retardation values of positive optical film at measurement wavelength of 450 nm and 550 nm, respectively $Nz_{NEA}(550)$, $Nz_{PNZ}(550)$: Nz values of negative substantially uniaxial optical film and positive optical film, respectively, at measurement wavelength of 550 nm $R_{TAC1}(550)$, $R_{TAC2}(550)$: in-plane phase retardation values of triacetyl cellulose films 1 and 2, respectively, at measurement wavelength of 550 nm $Rth_{TAC1}(550)$, $Rth_{TAC2}(550)$: Rth values of triacetyl cellulose films 1 and 2, respectively, at measurement wavelength of 550 nm Example 6

Figure 6:
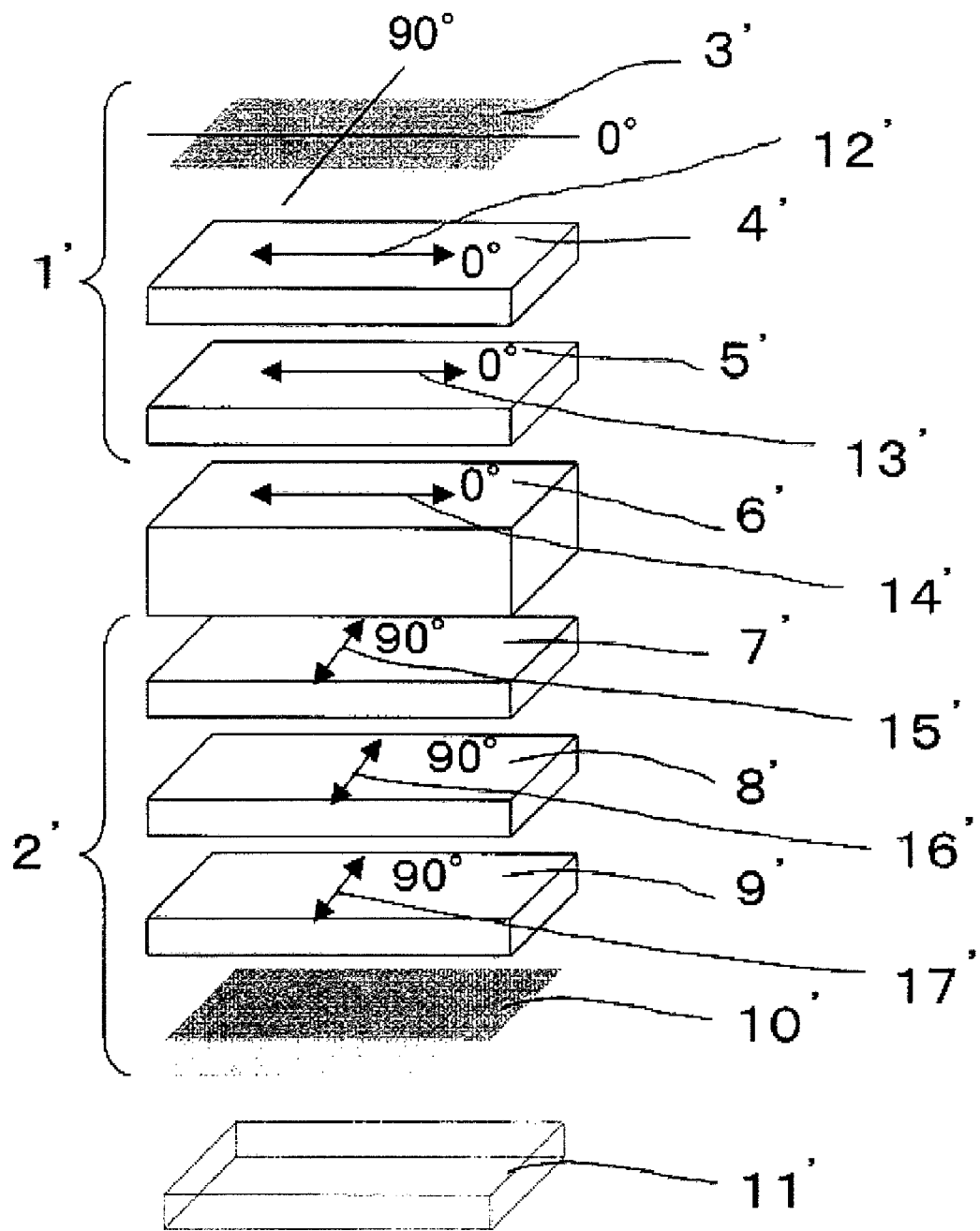
FIG. 6 is an arrangement view of optical elements in Examples 6 and 8 to 10. The angles in the figure show azimuthal angles. Adhesion layers and tackiness agent layers between the optical elements are omitted.

FIG. 6 shows an arrangement of an optical element in Example 6. In FIG. 6, numeral 1' denotes a polarizing film on the observer side, 2' denotes a laminated polarizing film on the light source side (second laminated polarizing film of the invention), 3' denotes a protective film, 4' denotes a polarizing film, 5' denotes a triacetyl cellulose film (TAC1'), 6' denotes an IPS liquid crystal cell, 7' denotes a positive substantially uniaxial optical film, 8' denotes a negative optical film, 9' denotes a polarizing film, 10' denotes a protective film, 11' denotes a backlight (light source), 12' denotes an absorption axis, 13' denotes a phase slow axis, 14' denotes a phase slow axis (liquid crystal orientation axis), 15' denotes a phase slow axis, 16' denotes a phase slow axis, and 17' denotes an absorption axis.

(Production of Laminated Polarizing Film on Light Source Side (Second Laminated Polarizing Film of the Invention) 2')

In production of the laminated polarizing film on the light source side (second laminated polarizing film of the invention) 2' shown in FIG. 6, a triacetyl cellulose film having a thickness of 80 μm having been saponified, which was disposed outside the polarizing film 9' as viewed from the IPS liquid crystal cell 6' and functioned as the protective film 10' for the polarizing film 9', was adhered to the polarizing film 10' with an adhesive containing polyvinyl alcohol having glyoxal added thereto by lamination in a roll-to-roll process.

The negative optical film 8' containing the copolymer polycarbonate having the optical characteristics shown in Table 2 produced in the item (4-1), which had been subjected to a corona treatment on the surface thereof, was then similarly adhered to the surface of the polarizing film 9' opposite to the protective film 10' with a water-soluble polyurethane adhesive by a roll-to-roll process.

The positive substantially uniaxial optical film 7' containing the amorphous polyolefin (APO) having the optical characteristics shown in Table 2 produced in the item (3-1) was subjected to a corona treatment and adhered to the surface of the negative optical film 8' by lamination in a roll-to-roll process, so as to provide the laminated polarizing film on the light source side (second laminated polarizing film of the invention) 2'.

In the laminated polarizing film on the light source side (second laminated polarizing film of the invention) 2' thus obtained, the principal orientation direction of polymer main chains of the positive substantially uniaxial optical film 7' and the absorption axis of the polarizing film 9' were in parallel to each other, and the principal orientation direction of polymer main chains of the negative optical film 8' and the absorption axis of the polarizing film 9' were perpendicular to each other.

(Production of Polarizing Film on Observer Side 1')

In production of the polarizing film on the observer side 1' shown in FIG. 6, a triacetyl cellulose film having a thickness of 80 μm having been saponified, which was disposed outside the polarizing film 4' as viewed from the IPS liquid crystal cell 6' and functioned as the protective film 3' for the polarizing film 4', was adhered to the polarizing film 4' with an adhesive containing polyvinyl alcohol having glyoxal added thereto by lamination in a roll-to-roll process.

The triacetyl cellulose film (TAC1') 5' having the optical characteristics shown in Table 2 and a thickness of 80 μm, which had been subjected to a saponification treatment, was then similarly adhered to the opposite surface of the polarizing film 4' by a roll-to-roll process to provide the polarizing film on the observer side 1'.

(Evaluation of Viewing Angle of Liquid Crystal Display Device)

A liquid crystal display device was produced by using the laminated polarizing film on the light source side (second laminated polarizing film of the invention) 2' and the polarizing film on the observer side 1', which had been obtained above, the IPS liquid crystal cell 6' and the backlight 11', according the constitution disclosed in FIG. 6, and evaluated for viewing angle characteristics. The evaluation results are shown in FIG. 10.

Figure 10:
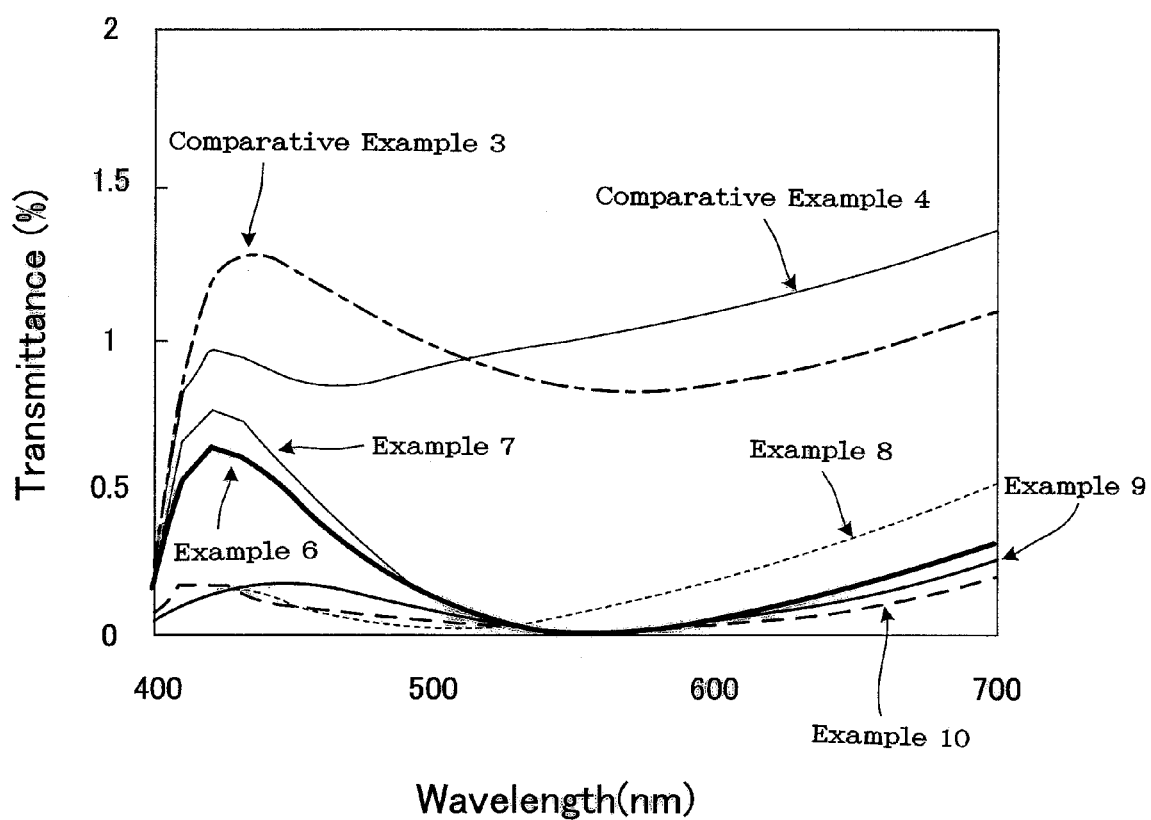
FIG. 10 is transmittance spectra in a black state at an incident angle of 60° and an azimuthal angle of 45° of liquid crystal display devices in Examples 6 to 10 and Comparative Examples 3 and 4.

As shown in FIG. 10, it was found that the liquid crystal display device produced in Example 6 had a transmittance of less than 0.5% at from 450 to 650 nm, in which a human had high visibility, and thus had an effect of enhancing the viewing angle. As a result of visual observation of the black state, it was confirmed that change in brightness depending on viewing angle was small, and the viewing angle was significantly enhanced.

Example 7

Figure 7:
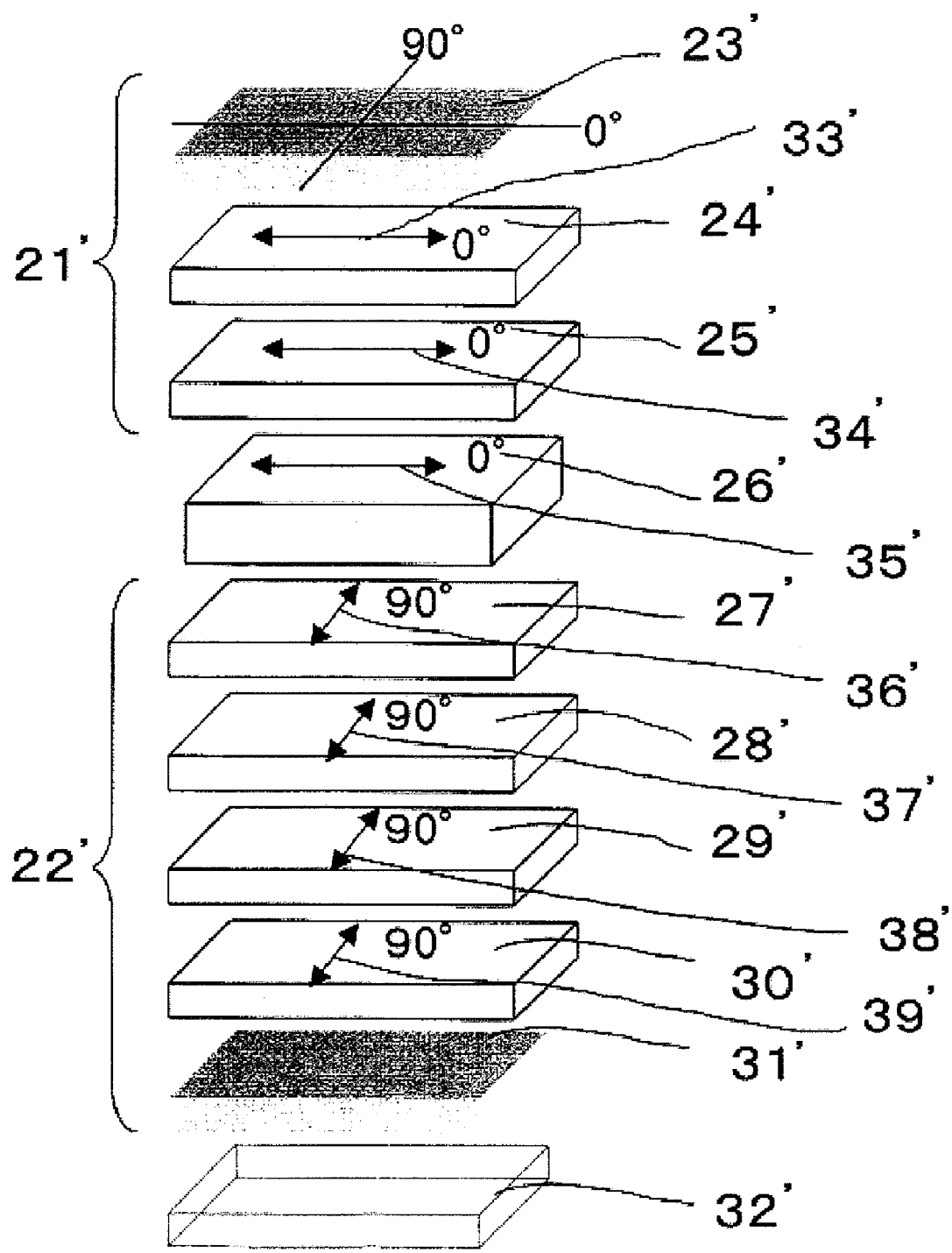
FIG. 7 is an arrangement view of optical elements in Example 7. The angles in the figure show azimuthal angles. Adhesion layers and tackiness agent layers between the optical elements are omitted.

FIG. 7 shows an arrangement of an optical element in Example 7. In FIG. 7, numeral 21' denotes a polarizing film on the observer side, 22' denotes a laminated polarizing film on the light source side (second laminated polarizing film of the invention), 23' denotes a protective film, 24' denotes a polarizing film, 25' denotes a triacetyl cellulose film (TAC1'), 26' denotes an IPS liquid crystal cell, 27' denotes a positive substantially uniaxial optical film, 28' denotes a negative optical film, 29' denotes a triacetyl cellulose film (TAC2'), 30' denotes a polarizing film, 31' denotes a protective film, 32' denotes a backlight (light source), 33' denotes an absorption axis, 34' denotes a phase slow axis, 35' denotes a phase slow axis (liquid crystal orientation axis), 36' denotes a phase slow axis, 37' denotes a phase slow axis, 38' denotes a phase slow axis, and 39' denotes an absorption axis.

(Production of Laminated Polarizing Film on Light Source Side (Second Laminated Polarizing Film of the Invention) 22')

In production of the laminated polarizing film on the light source side (second laminated polarizing film of the invention) 22' shown in FIG. 7, a triacetyl cellulose film having a thickness of 80 μm having been saponified, which was disposed outside the polarizing film 30' as viewed from the IPS liquid crystal cell 26' and functioned as the protective film 31' for the polarizing film 30', was adhered to the polarizing film 30' with an adhesive containing polyvinyl alcohol having glyoxal added thereto by lamination in a roll-to-roll process.

The triacetyl cellulose film (TAC2') 29' having the optical characteristics shown in Table 2 and a thickness of 80 μm, which had been subjected to a saponification treatment, was then similarly adhered to the opposite surface of the polarizing film 30' by a roll-to-roll process.

The negative optical film 28' containing the copolymer polycarbonate having the optical characteristics shown in Table 2 produced in the item (4-1), which had been subjected to a corona treatment on the surface thereof, was then similarly adhered to the surface of the triacetyl cellulose film (TAC2') 29' with an acrylic adhesive by lamination in a roll-to-roll process.

The positive substantially uniaxial optical film 27' containing the amorphous polyolefin (APO) having the optical characteristics shown in Table 2 produced in the item (3-1) and the negative optical film 28' were adhered to each other by a roll-to-roll process to provide the laminated polarizing film on the light source side (second laminated polarizing film of the invention) 22'.

In the laminated polarizing film on the light source side (second laminated polarizing film of the invention) 22' thus obtained, the principal orientation direction of polymer main chains of the positive substantially uniaxial optical film 27' and the absorption axis of the polarizing film 30' were in parallel to each other, and the principal orientation direction of polymer main chains of the negative optical film 28' and the absorption axis of the polarizing film 30' were perpendicular to each other.

(Production of Polarizing Film on Observer Side 21')

The polarizing film on the observer side 21' was produced in the same manner as the polarizing film on the observer side 1' in Example 6.

(Evaluation of Viewing Angle of Liquid Crystal Display Device)

A liquid crystal display device was produced by using the laminated polarizing film on the light source side (second laminated polarizing film of the invention) 22' and the polarizing film on the observer side 21', which had been obtained above, the IPS liquid crystal cell 26' and the backlight 32', according the constitution disclosed in FIG. 7, and evaluated for viewing angle characteristics. The evaluation results are shown in FIG. 10.

As shown in FIG. 10, it was found that the liquid crystal display device produced in Example 7 had a transmittance of less than 0.5% at from 450 to 650 nm, in which a human had high visibility, and thus had an effect of enhancing the viewing angle. As a result of visual observation of the black state, it was confirmed that change in brightness depending on viewing angle was small, and the viewing angle was significantly enhanced.

Example 8

In Example 8, an optical element having an arrangement shown in FIG. 6 was produced as similar to Example 6.

(Production of Laminated Polarizing Film on Light Source Side (Second Laminated Polarizing Film of the Invention) 2')

The laminated polarizing film on the light source side (second laminated polarizing film of the invention) 2' was produced in the same manner as in Example 6 except that the negative optical film containing the copolymer polycarbonate produced in the item (4-1) and the positive substantially uniaxial optical film containing the amorphous polyolefin (APO) produced in the item (3-1), having the optical characteristics shown in Table 2, were used.

(Production of Polarizing Film on Observer Side 1')

The polarizing film on the observer side 1' was produced in the same manner as the polarizing film on the observer side 1' in Example 6.

(Evaluation of Viewing Angle of Liquid Crystal Display Device)

A liquid crystal display device was produced by using the laminated polarizing film on the light source side (second laminated polarizing film of the invention) 2' and the polarizing film on the observer side 1', which had been obtained above, the IPS liquid crystal cell 6' and the backlight 11', according the constitution disclosed in FIG. 6, and evaluated for viewing angle characteristics. The evaluation results are shown in FIG. 10.

As shown in FIG. 10, it was found that the liquid crystal display device produced in Example 8 had a transmittance of less than 0.5% at from 450 to 650 nm, in which a human had high visibility, and thus had an effect of enhancing the viewing angle. As a result of visual observation of the black state, it was confirmed that change in brightness depending on viewing angle was small, and the viewing angle was significantly enhanced.

Example 9

In Example 9, an optical element having an arrangement shown in FIG. 6 was produced as similar to Example 6.
(Production of Laminated Polarizing Film on Light Source Side (Second Laminated Polarizing Film of the Invention) 2')

The laminated polarizing film on the light source side (second laminated polarizing film of the invention) 2' was produced in the same manner as in Example 6 except that the positive optical film containing the copolymer polycarbonate produced in the item (4-1) and the negative substantially uniaxial optical film containing the copolymer polycarbonate produced in the item (3-2), having the optical characteristics shown in Table 2, were used.
(Production of Polarizing Film on Observer Side 1')

The polarizing film on the observer side 1' was produced in the same manner as the polarizing film on the observer side 1' in Example 6.
(Evaluation of Viewing Angle of Liquid Crystal Display Device)

A liquid crystal display device was produced by using the laminated polarizing film on the light source side (second laminated polarizing film of the invention) 2' and the polarizing film on the observer side 1', which had been obtained above, the IPS liquid crystal cell 6' and the backlight 11', according the constitution disclosed in FIG. 6, and evaluated for viewing angle characteristics. The evaluation results are shown in FIG. 10.

As shown in FIG. 10, it was found that the liquid crystal display device produced in Example 9 had a transmittance of less than 0.5% at from 450 to 650 nm, in which a human had high visibility, and thus had an effect of enhancing the viewing angle. As a result of visual observation of the black state, it was confirmed that change in brightness depending on viewing angle was small, and the viewing angle was significantly enhanced.

Example 10

In Example 10, an optical element having an arrangement shown in FIG. 6 was produced as similar to Example 6.
(Production of Laminated Polarizing Film on Light Source Side (Second Laminated Polarizing Film of the Invention) 2')

The laminated polarizing film on the light source side (second laminated polarizing film of the invention) 2' was produced in the same manner as in Example 6 except that the positive optical film containing the blend of polyphenylene oxide and polystyrene produced in the item (4-2) and the negative substantially uniaxial optical film containing the copolymer polycarbonate produced in the item (3-2), having the optical characteristics shown in Table 2, were used.
(Production of Polarizing Film on Observer Side 1')

The polarizing film on the observer side 1' was produced in the same manner as the polarizing film on the observer side 1' in Example 6.

(Evaluation of Viewing Angle of Liquid Crystal Display Device)

A liquid crystal display device was produced by using the laminated polarizing film on the light source side (second laminated polarizing film of the invention) 2' and the polarizing film on the observer side 1', which had been obtained above, the IPS liquid crystal cell 6' and the backlight 11', according the constitution disclosed in FIG. 6, and evaluated for viewing angle characteristics. The evaluation results are shown in FIG. 10.

As shown in FIG. 10, it was found that the liquid crystal display device produced in Example 10 had a transmittance of less than 0.5% at from 450 to 650 nm, in which a human had high visibility, and thus had an effect of enhancing the viewing angle. As a result of visual observation of the black state, it was confirmed that change in brightness depending on viewing angle was small, and the viewing angle was significantly enhanced.

Comparative Example 3

Figure 8:
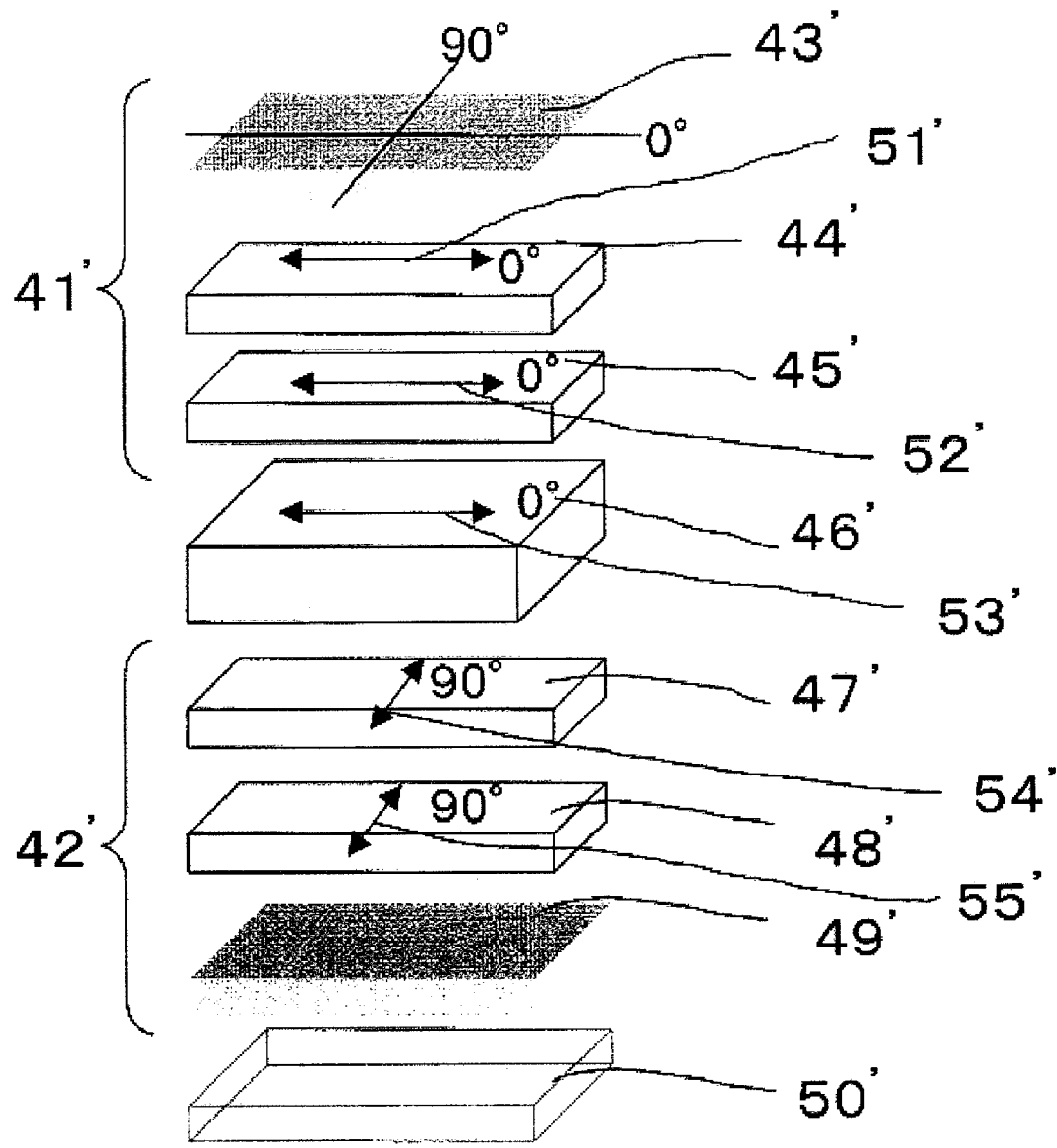
FIG. 8 is an arrangement view of optical elements in Comparative Example 3. The angles in the figure show azimuthal angles. Adhesion layers and tackiness agent layers between the optical elements are omitted.

FIG. 8 shows an arrangement of an optical element in Comparative Example 3. In FIG. 8, numeral 41' denotes a polarizing film on the observer side, 42' denotes a polarizing film on the light source side, 43' denotes a protective film, 44' denotes a polarizing film, 45' denotes a triacetyl cellulose film (TAC1'), 46' denotes an IPS liquid crystal cell, 47' denotes a triacetyl cellulose film (TAC2'), 48' denotes a polarizing film, 49' denotes a protective film, 50' denotes a backlight (light source), 51' denotes an absorption axis, 52' denotes a phase slow axis, 53' denotes a phase slow axis (liquid crystal orientation axis), 54' denotes a phase slow axis, and 55' denotes an absorption axis.
(Production of Laminated Polarizing Film on Light Source Side 42')

The polarizing film on the light source side 42' was produced in the same manner as in the production of the polarizing film on the observer side 1' in Example 6 by using the triacetyl cellulose film (TAC1') having the optical characteristics shown in Table 2 used in Example 6.
(Production of Polarizing Film on Observer Side 41')

The polarizing film on the observer side 41' was produced in the same manner as the polarizing film on the observer side 1' in Example 6.
(Evaluation of Viewing Angle of Liquid Crystal Display Device)

A liquid crystal display device was produced by using the laminated polarizing film on the light source side 42' and the polarizing film on the observer side 41', which had been obtained above, the IPS liquid crystal cell 46' and the backlight 50', according the constitution disclosed in FIG. 8, and evaluated for viewing angle characteristics. The evaluation results are shown in FIG. 10.

As shown in FIG. 10, it was found that the liquid crystal display device produced in Comparative Example 3 had a higher transmittance than those of Examples, in particular, has a transmittance of about 1% or more at from 450 to 650 nm, in which a human had high visibility, and thus had no effect of enhancing the viewing angle.

Comparative Example 4

Figure 9:
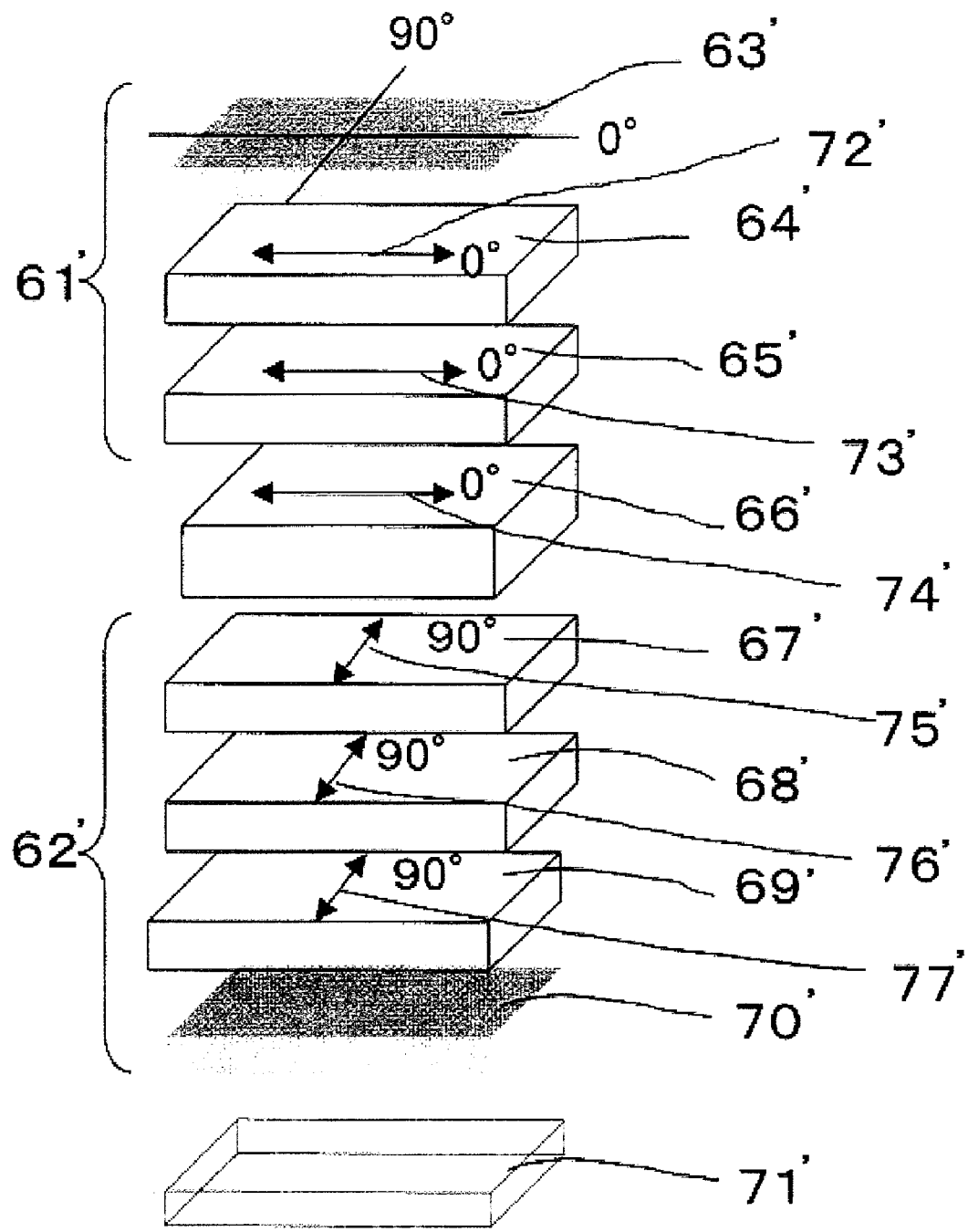
FIG. 9 is an arrangement view of optical elements in Comparative Example 4. The angles in the figure show azimuthal angles. Adhesion layers and tackiness agent layers between the optical elements are omitted.

FIG. 9 shows an arrangement of an optical element in Comparative Example 4. In FIG. 9, numeral 61' denotes a polarizing film on the observer side, 62' denotes a laminated polarizing film on the light source side, 63' denotes a protective film, 64' denotes a polarizing film, 65' denotes a triacetyl cellulose film (TAC1'), 66' denotes an IPS liquid crystal cell, 67' denotes a negative optical film, 68' denotes a positive substantially uniaxial optical film, 69' denotes a polarizing film, 70' denotes a protective film, 71' denotes a backlight (light source), 72' denotes an absorption axis, 73' denotes a phase slow axis, 74' denotes a phase slow axis (liquid crystal orientation axis), 75' denotes a phase slow axis, 76' denotes a phase slow axis, and 77' denotes an absorption axis.

(Production of Laminated Polarizing Film on Light Source Side 62')

The laminated polarizing film on the light source side 62' was produced in the same manner as in Example 6 except that the order of lamination of the two phase retardation films in the laminated polarizing film on the light source side 62' was reversed. The two optical films used had the same optical characteristics as in Example 6.

(Production of Polarizing Film on Observer Side 61')

The polarizing film on the observer side 61' was produced in the same manner as the polarizing film on the observer side 1' in Example 6.

(Evaluation of Viewing Angle of Liquid Crystal Display Device)

A liquid crystal display device was produced by using the laminated polarizing film on the light source side 62' and the polarizing film on the observer side 61', which had been obtained above, the IPS liquid crystal cell 66' and the backlight 71', according the constitution disclosed in FIG. 9, and evaluated for viewing angle characteristics. The evaluation results are shown in FIG. 10.

As shown in FIG. 10, it was found that the liquid crystal display device produced in Comparative Example 4 had a higher transmittance than those of Examples, in particular, has a transmittance of about 1% or more at from 450 to 650 nm, in which a human had high visibility, and thus had a narrow viewing angle.

TABLE 2

|  | Example 6 | Example 7 | Example 8 | Example 9 | Example 10 |
|---|---|---|---|---|---|
| $R_{POA}$ (450) | 109 | 111 | 88 | 98 | 98 |
| $R_{POA}$ (550) | 108 | 110 | 87 | 119 | 120 |
| $R_{NNZ}$ (450) | 73 | 87 | 66 | 69 | 45 |
| $R_{NNZ}$ (550) | 61 | 72 | 55 | 57 | 54 |
| $Nz_{POA}$ (550) | 1.0 | 1.0 | 1.0 | 1.0 | 1.0 |
| $Nz_{NNZ}$ (550) | −0.3 | −0.3 | −0.3 | −0.3 | −0.3 |
| $R_{TAC1'}$ (550) | 1 | 1 | 1 | 1 | 1 |
| $Rth_{TAC1'}$ (550) | 13 | 13 | 13 | 13 | 13 |
| $R_{TAC2'}$ (550) | none | 1 | none | none | none |
| $Rth_{TAC2'}$ (550) | none | 13 | none | none | none |

$R_{POA}$(450), $R_{POA}$(550): in-plane phase retardation values of positive substantially uniaxial optical film at measurement wavelength of 450 nm and 550 nm, respectively $R_{NNZ}$(450), $R_{NNZ}$(550): in-plane phase retardation values of negative optical film at measurement wavelength of 450 nm and 550 nm, respectively $Nz_{POA}$(550), $Nz_{NNZ}$(550): Nz values of positive substantially uniaxial optical film and negative optical film, respectively, at measurement wavelength of 550 nm $R_{TAC1'}$(550), $R_{TAC2'}$(550): in-plane phase retardation values of triacetyl cellulose films 1' and 2', respectively, at measurement wavelength of 550 nm $Rth_{TAC1'}$(550), $Rth_{TAC2'}$(550): Rth values of triacetyl cellulose films 1' and 2', respectively, at measurement wavelength of 550 nm

INDUSTRIAL APPLICABILITY

The laminated polarizing film of the invention can be produced by a roll-to-roll process and thus is excellent in polarization scrambling capability and homogeneity thereof, and a liquid crystal display device can have high performance, particularly an enhanced viewing angle, by applying the laminated polarizing film to the display device.

The invention claimed is:

1. A laminated polarizing film comprising a negative substantially uniaxial optical film comprising a thermoplastic polymer having a negative molecular polarizability anisotropy, a positive optical film comprising a thermoplastic polymer having a positive molecular polarizability anisotropy, and a polarizing film, that are laminated at least in this order, a slow axis within a film plane of the negative substantially uniaxial optical film and a slow axis within a film plane of the positive optical film being substantially in parallel to each other, and each being substantially perpendicular to an absorption axis of the polarizing film,
a positional relationship between a principal orientation direction of polymer main chains of the negative substantially uniaxial optical film and the absorption axis of the polarizing film being substantially in parallel, and a positional relationship between a principal orientation direction of polymer main chains of the positive optical film and the absorption axis of the polarizing film being substantially perpendicular,
wherein an in-plane phase retardation value $R_{NEA}(\lambda)$ of the negative substantially uniaxial optical film, in-plane phase retardation value $R_{PNZ}(\lambda)$ of the positive optical film, and an orientation index in a thickness direction $Nz(\lambda)$ of the positive optical film that is defined by the following three refractive indices satisfy the following expressions (1) to (3) at a measurement wavelength $\lambda$ of 550 nm:

$$Nz=(n_x-n_z)/(n_x-n_y)$$

$n_x$: refractive index in a direction within a film plane where the refractive index is maximized $n_y$: refractive index in a direction within a film plane perpendicular to the direction where the refractive index is maximized $n_z$: refractive index in a normal direction with respect to the film plane $$50 \leq R_{NEA}(\lambda) \leq 170 \quad (1)$$

$$15 \leq R_{PNZ}(\lambda) \leq 90 \quad (2)$$

$$1.05 \leq Nz(\lambda) \leq 1.7 \quad (3).$$

2. The laminated polarizing film according to claim 1, wherein the negative substantially uniaxial optical film, the positive optical film or both of them have reverse wavelength dispersion characteristics of the phase retardation.

3. The laminated polarizing film according to claim 1, wherein the thermoplastic polymer having a negative molecular polarizability anisotropy contains polycarbonate having a fluorene skeleton.

4. The laminated polarizing film according to claim 1, wherein the thermoplastic polymer having a positive molecular polarizability anisotropy contains amorphous polyolefin.

5. The laminated polarizing film according to claim 4, wherein the amorphous polyolefin (i) is a copolymer containing ethylene and norbornene, and (ii) has a ratio of a meso configuration and a rasemo configuration of meso/rasemo >4 in a steric configuration of a dyad of a norbornene unit.

6. The laminated polarizing film according to claim 1, wherein the negative substantially uniaxial optical film is produced by longitudinal uniaxial stretching, and the positive optical film is produced by transversal uniaxial stretching.

7. The laminated polarizing film according to claim 1, wherein the laminated polarizing film is in a roll form, the slow axes within a film plane of the negative substantially uniaxial optical film and the positive optical film are substantially perpendicular to a longitudinal direction, and the absorption axis of the polarizing film is substantially in parallel to the longitudinal direction.

8. The negative substantially uniaxial optical film or the positive optical film constituting the laminated polarizing film according to claim 1.

9. A laminated phase retardation film comprising the negative substantially uniaxial optical film and the positive optical film according to claim 1 that are laminated on each other.

10. A liquid crystal display device comprising the laminated polarizing film according to claim 1.

11. A laminated polarizing film comprising a positive substantially uniaxial optical film comprising a thermoplastic polymer having a positive molecular polarizability anisotropy, a negative optical film comprising a thermoplastic polymer having a negative molecular polarizability anisotropy, and a polarizing film, that are laminated at least in this order, a slow axis within a film plane of the positive substantially uniaxial optical film and a slow axis within a film plane of the negative optical film each being substantially in parallel to an absorption axis of the polarizing film,
  a positional relationship between a principal orientation direction of polymer main chains of the positive substantially uniaxial optical film and the absorption axis of the polarizing film being substantially in parallel, and a positional relationship between a principal orientation direction of polymer main chains of the negative optical film and the absorption axis of the polarizing film being substantially perpendicular,
  wherein an in-plane phase retardation value $R_{POA}(\lambda)$ of the positive substantially uniaxial optical film, in-plane phase retardation value $R_{NNZ}(\lambda)$ of the negative optical film, and an orientation index in a thickness direction $Nz(\lambda)$ of the negative optical film that is defined by the following three refractive indices satisfy the following expressions (21) to (23) at a measurement wavelength $\lambda$ of 550 nm:

$$Nz=(n_x-n_z)/(n_x-n_y)$$

$n_x$: refractive index in a direction within a film plane where the refractive index is maximized $n_y$: refractive index in a direction within a film plane perpendicular to the direction where the refractive index is maximized $n_z$: refractive index in a normal direction with respect to the film plane $$30 \leq R_{POA}(\lambda) \leq 170 \tag{21}$$

$$30 \leq R_{NNZ}(\lambda) \leq 120 \tag{22}$$

$$-0.8 \leq Nz(\lambda) \leq -0.1 \tag{23}.$$

12. The laminated polarizing film according to claim 11, wherein the positive substantially uniaxial optical film, the negative optical film or both of them have reverse wavelength dispersion characteristics of the phase retardation.

13. The laminated polarizing film according to claim 11, wherein the thermoplastic polymer having a negative molecular polarizability anisotropy contains polycarbonate having a fluorene skeleton.

14. The laminated polarizing film according to claim 11, wherein the thermoplastic polymer having a positive molecular polarizability anisotropy contains amorphous polyolefin.

15. The laminated polarizing film according to claim 14, wherein the amorphous polyolefin (i) is a copolymer containing ethylene and norbornene, and (ii) has a ratio of a meso configuration and a rasemo configuration of meso/rasemo >4 in a steric configuration of a dyad of a norbornene unit.

16. The laminated polarizing film according to claim 11, wherein the positive substantially uniaxial optical film is produced by longitudinal uniaxial stretching, and the negative optical film is produced by transversal uniaxial stretching.

17. The laminated polarizing film according to claim 11, wherein the laminated polarizing film is in a roll form, the slow axes within a film plane of the positive substantially uniaxial optical film and the negative optical film are substantially perpendicular to a longitudinal direction, and the absorption axis of the polarizing film is substantially in parallel to the longitudinal direction.

18. The positive substantially uniaxial optical film or the negative optical film constituting the laminated polarizing film according to claim 11.

19. A laminated phase retardation film comprising the positive substantially uniaxial optical film and the negative optical film according to claim 11 that are laminated on each other.

20. A liquid crystal display device comprising the laminated polarizing film according to claim 11.

* * * * *